(12) United States Patent
Ahmed et al.

(10) Patent No.: US 11,955,127 B2
(45) Date of Patent: Apr. 9, 2024

(54) COGNITIVE CORRELATION OF GROUP INTERACTIONS

(71) Applicant: Kyndryl, Inc., New York, NY (US)

(72) Inventors: Muhammad Ammar Ahmed, Karachi (PK); Madiha Ijaz, Lahore (PK); Sreekrishnan Venkateswaran, Bangalore (IN)

(73) Assignee: KYNDRYL, INC., New York, NY (US)

( * ) Notice: Subject to any disclaimer, the term of this patent is extended or adjusted under 35 U.S.C. 154(b) by 450 days.

(21) Appl. No.: 17/225,286

(22) Filed: Apr. 8, 2021

(65) Prior Publication Data
US 2022/0270612 A1    Aug. 25, 2022

(30) Foreign Application Priority Data

Feb. 24, 2021  (PK) .................................... 154/2021

(51) Int. Cl.
*G10L 17/04* (2013.01)
*G06F 40/216* (2020.01)
(Continued)

(52) U.S. Cl.
CPC ............ *G10L 17/04* (2013.01); *G06F 40/216* (2020.01); *G06F 40/295* (2020.01); *G06F 40/30* (2020.01);
(Continued)

(58) Field of Classification Search
CPC ......... G10L 17/04; G10L 17/02; G10L 17/06; G10L 17/22; G10L 15/26; G06F 40/216;
(Continued)

(56) References Cited

U.S. PATENT DOCUMENTS

| 6,687,671 B2 * | 2/2004 | Gudorf .................. G10L 15/26 704/235 |
| 8,687,941 B2 * | 4/2014 | Dirik .............. H04N 21/234363 386/240 |

(Continued)

FOREIGN PATENT DOCUMENTS

| CN | 110717031 A | 1/2020 |
| RU | 2488227 C2 | 2/2012 |

OTHER PUBLICATIONS

Jain et al., Experiential meeting system, Dec. 2003, ETP'03, Nov. 7, 2003, Berkeley, California, USA.
(Continued)

*Primary Examiner* — Edwin S Leland, III
(74) *Attorney, Agent, or Firm* — Erik Swanson; Andrew M. Calderon; Calderon Safran & Cole, P.C

(57) ABSTRACT

An embodiment extracts a set of designated entities and a set of relationships between designated entities from speech content of an audio feed of a plurality of participants of a current web conference using a machine learning model trained to classify parts of speech content. The embodiment generates a list of current action items based on the extracted set of designated entities and relationships between designated entities. The embodiment identifies a first current action item that is an updated version of an ongoing action item on a progress list of ongoing action items from past web conferences. The embodiment also identifies a second current action item that is unrelated to any of the ongoing action items on the progress list. The embodiment updates the progress list to include updates for the first current action item and by adding the second current action item.

19 Claims, 15 Drawing Sheets

(51) Int. Cl.
| | |
|---|---|
| *G06F 40/295* | (2020.01) |
| *G06F 40/30* | (2020.01) |
| *G06F 40/35* | (2020.01) |
| *G06Q 10/0631* | (2023.01) |
| *G10L 17/02* | (2013.01) |
| *G10L 17/06* | (2013.01) |
| *G10L 17/22* | (2013.01) |
| *G10L 15/26* | (2006.01) |

(52) U.S. Cl.
CPC ..... *G06F 40/35* (2020.01); *G06Q 10/063118* (2013.01); *G10L 17/02* (2013.01); *G10L 17/06* (2013.01); *G10L 17/22* (2013.01); *G10L 15/26* (2013.01)

(58) Field of Classification Search
CPC ........ G06F 40/295; G06F 40/30; G06F 40/35; G06Q 10/063118
USPC .......................................................... 704/246
See application file for complete search history.

(56) References Cited

U.S. PATENT DOCUMENTS

| | | | | |
|---|---|---|---|---|
| 8,739,046 | B2* | 5/2014 | Sloyer | G06Q 10/10 709/204 |
| 8,914,452 | B2* | 12/2014 | Boston | G06Q 10/10 709/206 |
| 9,426,025 | B2* | 8/2016 | Nieminen | H04L 67/60 |
| 9,558,181 | B2* | 1/2017 | Cecchi | G06F 40/30 |
| 9,582,496 | B2* | 2/2017 | Cecchi | G06F 40/30 |
| 10,445,706 | B2* | 10/2019 | Kitada | H04M 3/567 |
| 10,777,206 | B2* | 9/2020 | Liu | G10L 17/22 |
| 10,873,611 | B2* | 12/2020 | Zlatarev | G06F 3/0481 |
| 10,909,485 | B2* | 2/2021 | Kundu | G06F 3/0484 |
| 10,963,505 | B2* | 3/2021 | Adlersberg | G06F 16/433 |
| 11,176,949 | B2* | 11/2021 | Adlersberg | G06F 40/35 |
| 11,308,427 | B2* | 4/2022 | Kundu | G06F 16/9535 |
| 11,417,344 | B2* | 8/2022 | Doi | G10L 17/06 |
| 11,501,780 | B2* | 11/2022 | Adlersberg | G06F 40/35 |
| 11,568,862 | B2* | 1/2023 | Chen | G10L 15/183 |
| 11,615,799 | B2* | 3/2023 | Zhu | G06F 16/345 704/235 |
| 11,694,443 | B2* | 7/2023 | Ijaz | G06V 20/70 382/159 |
| 2009/0119246 | A1* | 5/2009 | Kansal | G06F 16/48 |
| 2011/0145822 | A1* | 6/2011 | Rowe | G06Q 10/10 718/100 |
| 2011/0145823 | A1* | 6/2011 | Rowe | G06Q 10/109 707/755 |
| 2015/0358586 | A1* | 12/2015 | Chaudhry | H04N 7/155 348/14.09 |
| 2016/0117624 | A1* | 4/2016 | Flores | H04L 67/306 705/7.39 |
| 2016/0124908 | A1* | 5/2016 | Cecchi | G06F 16/35 704/9 |
| 2016/0124940 | A1* | 5/2016 | Cecchi | G06F 40/30 704/9 |
| 2017/0097929 | A1* | 4/2017 | Cecchi | G06F 16/35 |
| 2017/0310716 | A1* | 10/2017 | Lopez Venegas | G06Q 10/1093 |
| 2018/0122383 | A1* | 5/2018 | Raanani | H04M 3/5175 |
| 2018/0366128 | A1* | 12/2018 | Liu | G10L 17/22 |
| 2019/0108492 | A1* | 4/2019 | Nelson | G06F 40/186 |
| 2019/0130512 | A1* | 5/2019 | Kuhn | H04L 67/00 |
| 2019/0356709 | A1* | 11/2019 | Zlatarev | G06F 3/0481 |
| 2020/0104329 | A1* | 4/2020 | Kundu | G06Q 10/1095 |
| 2020/0104783 | A1* | 4/2020 | Kundu | G06Q 10/063112 |
| 2020/0104802 | A1* | 4/2020 | Kundu | G06F 16/9035 |
| 2020/0135211 | A1* | 4/2020 | Doi | G10L 17/04 |
| 2020/0242151 | A1* | 7/2020 | Adlersberg | G06F 16/483 |
| 2020/0243095 | A1* | 7/2020 | Adlersberg | G06F 40/216 |
| 2020/0279567 | A1* | 9/2020 | Adlersberg | G06F 40/35 |
| 2021/0158265 | A1* | 5/2021 | Kundu | G06F 16/9035 |
| 2021/0375289 | A1* | 12/2021 | Zhu | G06F 40/253 |
| 2021/0397845 | A1* | 12/2021 | Ijaz | G06F 40/30 |
| 2022/0101834 | A1* | 3/2022 | Chen | G10L 15/1822 |
| 2022/0254351 | A1* | 8/2022 | Jung | G10L 17/22 |
| 2022/0270612 | A1* | 8/2022 | Ahmed | G10L 17/06 |
| 2022/0272132 | A1* | 8/2022 | Ahmed | H04L 65/1083 |

OTHER PUBLICATIONS ip.com, Cognitive Recording Analyzer, Jul. 2, 2020.
ip.com, Cognitive meeting minutes capturing teleconference system, Oct. 26, 2018.
ip.com, Enhanced Meeting (Conference Call) Experience Using Measured Sensory Characteristics of Participants, Jun. 9, 2011.
ip.com, System for individualistic meeting minutes consolidation with intelligent categorization and querying mechanism, Apr. 22, 2014.
Buist et al., Automatic Summarization of Meeting Data: A Feasibility Study, Jan. 2004.
Feng et al., Extracting Action Sequences from Texts Based on Deep Reinforcement Learning, Proceedings of the Twenty-Seventh International Joint Conference on Artificial Intelligence (IJCAI-18), Mar. 7, 2018.
AIRA, How AIRA Generates Precise AI Meeting Notes for you, 2020, https://www.meetaira.ai/blogs/aira-generates-precise-ai-meeting-notes/.
List of all IBM related dockets, 2021.

* cited by examiner

COGNITIVE CORRELATION OF GROUP INTERACTIONS

BACKGROUND

The present invention relates generally to a method, system, and computer program product for processing of digital recordings. More particularly, the present invention relates to a method, system, and computer program product for cognitive correlation of group interactions.

Meetings with groups that include supervisors and coworkers are often held as part of the ordinary course of business. In some cases, a meeting may be one of a series of related meetings. For example, a group may be involved in a large project that is ongoing for several weeks, months, or years. This group may meet from time to time to discuss various aspects of the project. These meetings can be considered to be a series of related meetings. Alternatively, a group may be involved in a specific aspect of a business, such as accounting or marketing. This group may meet from time to time to discuss various aspects of some such aspect of the business. These meetings can also be considered to be a series of related meetings.

In some situations, a group may participate in electronic meetings, also known as web conferences. Web conferences may be interactions among individuals facilitated by electronic means, such as a web conference system. For example, a web conference system may facilitate speech-, text-, and/or video-enabled communication sessions among a plurality of individuals. Certain web conferences may include presentation of audio-visual (and/or other) content to meeting participants in addition/as an alternative to speech, text, and/or video communication. For example, certain web conference systems may permit meeting participants to view and/or control the presentation of various slides and/or other content. Web conferences allow for meetings between two or more individuals who are located in different locations such that an in-person meeting may not be practical. Web conferences allow a meeting to be conducted virtually such that the two or more participants interact with one another remotely.

SUMMARY

The illustrative embodiments provide for cognitive correlation of group interactions. An embodiment includes extracting, by an entity-relation extraction module, a set of designated entities and a set of relationships between designated entities from speech content of an audio feed of a plurality of participants of a current web conference, wherein the extracting uses a first machine learning model that is trained to classify parts of speech content. The embodiment also includes generating, by a current listing module, a list of current action items based on the extracted set of designated entities and the set of relationships between designated entities. The embodiment also includes identifying, by a list comparison module, a first current action item from the list of current action items that is an updated version of an ongoing action item on a progress list, wherein the progress list includes a set of ongoing action items from past web conferences prior to the current web conference. The embodiment also includes identifying, by the list comparison module, a second current action item from the list of current action items that is unrelated to any of the set of ongoing action items on the progress list. The embodiment also includes updating, by a progress list updating module, the progress list to an updated progress list by updating the first ongoing action item based on the first current action item and by adding the second current action item as a new ongoing action item on the progress list. The embodiment also includes generating, by a summary reporting module, a progress report based on the updated progress list. Other embodiments of this aspect include corresponding computer systems, apparatus, and computer programs recorded on one or more computer storage devices, each configured to perform the actions of the embodiment.

An embodiment includes a computer usable program product. The computer usable program product includes a computer-readable storage medium, and program instructions stored on the storage medium.

An embodiment includes a computer system. The computer system includes a processor, a computer-readable memory, and a computer-readable storage medium, and program instructions stored on the storage medium for execution by the processor via the memory.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
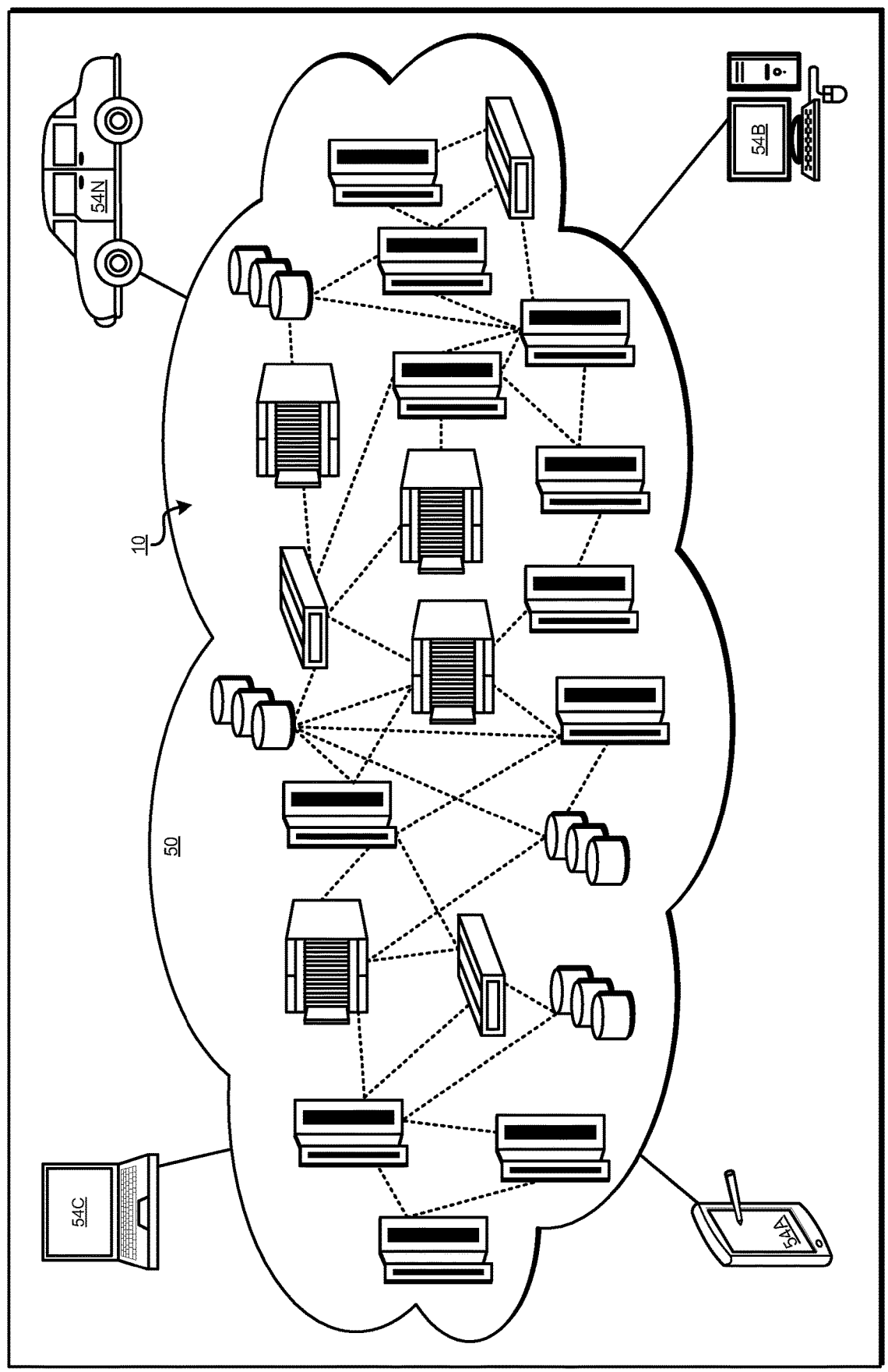
FIG. 1 depicts a cloud computing environment according to an embodiment of the present invention.

Generally, a meeting involves an oral presentation or discussion of one or more topics with live and/or remote attendance of conference participants. Oftentimes, multiple meeting participants may provide oral input during the conference. Sometimes a meeting is one of a series of related meetings. A series of "related meetings" as referred to herein may be any two or more meetings involving a common topic or related topics, such as meetings related to an ongoing project or meeting related to a particular department or other aspect of a business. Such meetings may include groups of people meeting in person and/or meeting remotely using a web conference system. Unless otherwise indicated, the term "meeting" as used herein refers to both in-person meetings and web conferences. Also, a "web conference" as used herein refers to any meeting that involves the use of an electronic system that facilitates speech-, text-, and/or video-enabled communication among a plurality of meeting participants.

Sometimes it is not possible for a meeting invitee to participate in a meeting. By not attending the meeting, the invitee is unable to efficiently obtain information from the meeting and may miss important information conveyed during the meeting. Sometimes a meeting may be recorded or a meeting participant may be assigned to record the minutes of the meeting or generate a meeting summary. However, while meeting minutes or summaries prepared by a participant may be helpful in some ways, they may miss important details, and typically do not include non-verbal cues, such as the attentiveness of other participants during the meeting or particular topics, or the energy involved in debating a particular topic, which can also be meaningful by imparting a level of interest or importance for the topic or meeting as a whole. A recording of a meeting can be very time consuming to review, and may miss aspects of a meeting, such as an audio recording in which meeting participants refer to a visual presentation, chart, diagram, or other visual aid. Importantly, a digital recording of a meeting typically includes valuable data that is underutilized when stored for the sole purpose of review by invitees that missed the meeting.

The illustrated embodiments address these issues by providing for cognitive encapsulation of group meetings. Exemplary embodiments leverage artificial intelligence (AI) techniques on digital recordings of meetings, which may include audio or video data, to perform various administrative tasks. The administrative tasks include tasks performed on during or after a meeting to update various types of administrative data. Examples of AI techniques utilized by exemplary embodiments to improve the usefulness of the digital recording data include AI processing to identify meeting participants that have leadership roles, AI processing to identify topics discussed during meetings, AI processing to identify action items discussed during meetings and update action items as they are discussed across a series of meetings, AI processing to identify debates and opinions expressed during meetings, AI processing to detect the attentiveness of meeting participants during meetings, AI processing to find media items related to action items that might be helpful to the meeting participants in performing the associated tasks, and summary reporting in which the contents and recipients of summaries is based on AI processing of the digital recording of the meeting.

Illustrative embodiments that provide for cognitive encapsulation of a meeting allow for segmenting audio feed data into a plurality of clusters. In some embodiments, the clusters correspond with respective meeting participants recorded during the meeting such that the number of clusters equals the number of meeting participants who were recorded speaking during the meeting. Some embodiments allow for identifying which meeting participant is speaking in each cluster, for example by detecting a self-introduction by the speaker in the audio data of the cluster.

Some exemplary embodiments allow for AI processing of digital recordings of meetings to detect meeting participants who have leadership roles, such as managers, team leaders, or other supervisory roles. In some such embodiments, leader detection is based on one or more scoring techniques involving analysis of the digital recording of the meeting, such as a preliminary leadership score based on audio features (e.g., speaking duration and/or interjections) and another preliminary leadership score based on video analysis of meeting participants, and a final leadership score based on one or more preliminary leadership scores. Some such embodiments allow for a computerized system that automatically generates a recipient list for a supervisory-level summary report of the meeting using the results of the leadership detection.

Some exemplary embodiments allow for AI processing of digital recordings of meetings to identify action items discussed during meetings. Some such embodiments allow for tracking the life cycle of action items across multiple meetings. In some embodiments, a digital recording of a meeting undergoes AI processing to extract certain entities and certain sets of relationships between those entities from speech content in the digital recording. The term "entities" as used herein refer to words or phrases that are included in a class of words and phrases that are indicative of an action item based on meaning and usage or context, making them identifiable by a trained machine learning model as being related to an action item, such as a participant name, a date, or a task.

In some embodiments, tasks may be identifiable by a trained machine learning model that is trained using a corpus of transcripts of past meetings, allowing the machine learning model to learn to identify words and phrases classified as tasks, and words and phrases classified as action items. Some such embodiments generate a list of current action items based on the extracted entities and relationships between entities from a digital recording of a most recent meeting. Some such embodiments allow for updating a progress list that includes ongoing action items discussed during past meetings with updates of those action items discussed during the most recent meeting, as well as adding new action items from the most recent meeting that were not previously discussed and therefore not previously present on the progress list. Some such embodiments allow for a computerized system that automatically generates a progress report that includes statuses of action items on the progress list as updated from the most recent meeting.

In some embodiments, a clustering process receives or accesses digital recordings of meetings and partitions the recordings into clusters of segments. In some embodiments, the clustering process performs a speaker diarization process of partitioning a digital recording into clusters of segments according to speaker identity. Embodiments of the clustering process may use any of a variety of technologies to partition digital recordings of meetings into speaker-based clusters. As a non-limiting example, some embodiments of the clustering process analyze a digital recording of a meeting to partition the recording into clusters and group the clusters into hypothesized speakers using a machine-learning clustering scheme, such as Agglomerative Hierarchical Clustering (AHC) or Spectral clustering (SC).

In some embodiments, a cluster verification process verifies that the number of clusters is equal to the number of meeting participants that spoke during the meeting. If the cluster verification process detects that the plurality of clusters is not equal in number to the plurality of participants, the cluster verification process signals the clustering process to repeat the clustering process in a different manner to correct the mismatch between the number of clusters and the number of speaking meeting participants.

In some embodiments, a model adjustment process is performed in conjunction with the clustering process and the cluster verification process to perform a model adjustment process until the number of clusters is satisfactory. In some embodiments, the model adjustment process includes performing one or more iterations of (a) performing the model adjustment process to adjust model parameters used for clustering, (b) performing the clustering process using the adjusted parameters to partition a recording into clusters, and (c) performing the cluster verification process to determine whether the number of clusters is satisfactory; if not, the processes are repeated until the number of clusters is satisfactory.

In some such embodiments, the cluster verification process receives the initially-clustered digital recording from the clustering process and determines whether the number of clusters is satisfactory based on whether the number of clusters is the same as the number of meeting participants who spoke while the meeting was being recorded. In some such embodiments, the cluster verification process determines the number of meeting participants who spoke while the meeting was being recorded in a variety of ways, for example from user input or as metadata that accompanies the recording of the meeting. In some embodiments, the cluster verification process receives a number of meeting participants and uses this as the number of speakers based on an underlying presumption that each meeting participant spoke at least once.

If the cluster verification process determines the number of clusters is not satisfactory, this result triggers the model adjustment process to adjust one or more parameters of the model used by the clustering process for the machine-learning clustering scheme. There are a variety of clustering schemes that may be used in actual implementations, so the actual model parameters, parameter values, and parameter adjustments are implementation specific.

Once the model adjustment process has completed the parameter adjustment, this triggers the clustering process to repeat the clustering of the digital recording of a meeting. The clustering process then provides the number of clusters to the clustering process to again determine whether the number of clusters is satisfactory. If not, then the parameters are readjusted and the recording is re-clustered again, and this continues until the number of clusters is satisfactory.

In some embodiments, a transcription process analyzes the audio of a digital recording of a meeting, including using speech recognition technology to retrieve the speech content of the audio. In some embodiments, the transcription process uses speech-to-text NLP algorithms to generate a text transcription of the incoming audio. The transcription process then provides the text transcription to other processes that may make use of the text transcription, such as a leader identification process or an action item identification process. In some embodiments, the transcription process stores the text transcription in memory, such as a database.

In some embodiments, a cluster labeling process generates metadata or header data for each cluster indicative of a meeting participant associated with that cluster. In some embodiments, the data added by the cluster labeling process is based on system settings, which may be set according to default or user preferences. In some embodiments, the cluster labeling process receives the speaker identity information from an identification process and associates the speaker identity information with the respective associated cluster, for example as metadata or header data.

For the sake of clarity of the description, and without implying any limitation thereto, the illustrative embodiments are described using some example configurations. From this disclosure, those of ordinary skill in the art will be able to conceive many alterations, adaptations, and modifications of a described configuration for achieving a described purpose, and the same are contemplated within the scope of the illustrative embodiments.

Furthermore, simplified diagrams of the data processing environments are used in the figures and the illustrative embodiments. In an actual computing environment, additional structures or components that are not shown or described herein, or structures or components different from those shown but for a similar function as described herein may be present without departing the scope of the illustrative embodiments.

Furthermore, the illustrative embodiments are described with respect to specific actual or hypothetical components only as examples. The steps described by the various illustrative embodiments can be adapted for providing explanations for decisions made by a machine-learning classifier model, for example.

Any specific manifestations of these and other similar artifacts are not intended to be limiting to the invention. Any suitable manifestation of these and other similar artifacts can be selected within the scope of the illustrative embodiments.

The examples in this disclosure are used only for the clarity of the description and are not limiting to the illustrative embodiments. Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, contrastive explanations, computer readable storage medium, high-level features, historical data, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
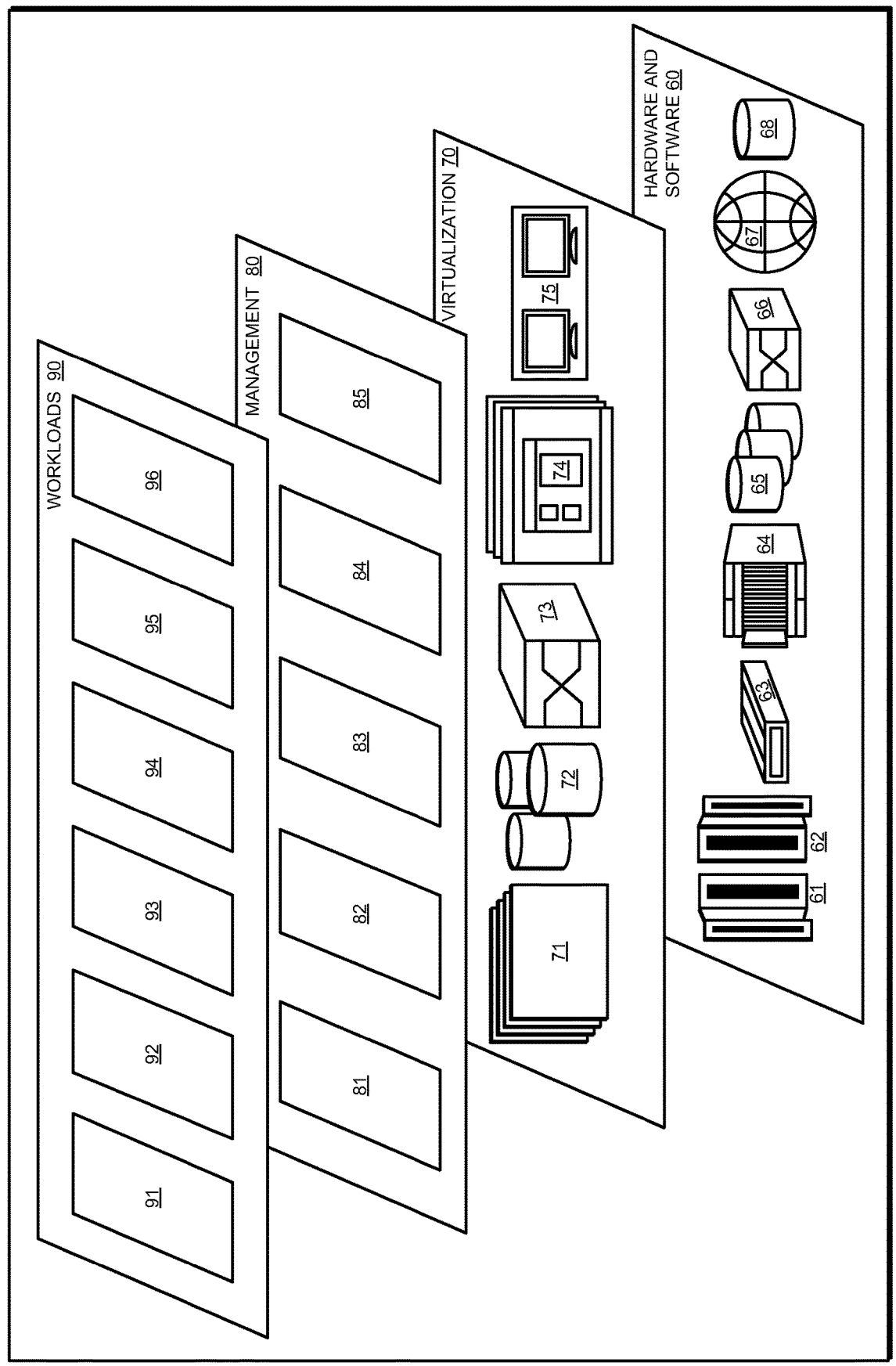
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and experience encapsulation processing 96.

Figure 3:
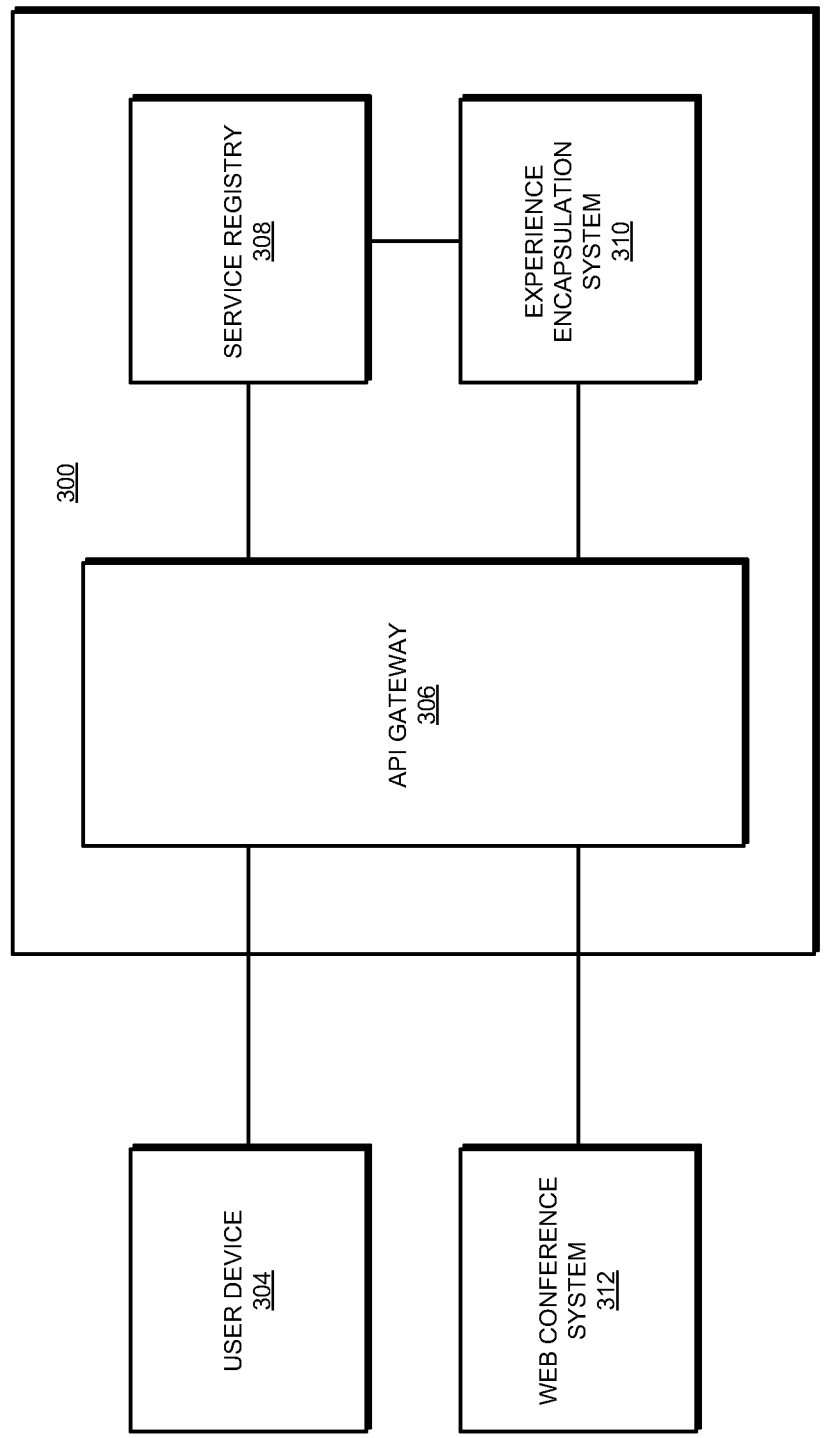
FIG. 3 depicts a block diagram of an example service infrastructure that includes an experience encapsulation system in accordance with an illustrative embodiment.

With reference to FIG. 3, this figure depicts a block diagram of an example service infrastructure 300 that includes an experience encapsulation system 310 in accordance with an illustrative embodiment. In some embodiments, the experience encapsulation system 310 is deployed in workloads layer 90 of FIG. 2. By way of example, in some embodiments, experience encapsulation system 310 is implemented as experience encapsulation processing 96 in FIG. 2.

In the illustrated embodiment, the service infrastructure 300 provides services and service instances to a user device 304 and an associated web conference system 312. User device 304 and web conference system 312 communicate with service infrastructure 300 via an API gateway 306. In various embodiments, service infrastructure 300 and its associated experience encapsulation system 310 serve multiple users and multiple tenants. A tenant is a group of users (e.g., a company) who share a common access with specific privileges to the software instance. Service infrastructure 300 ensures that tenant specific data is isolated from other tenants.

In some embodiments, user device 304 and web conference system 312 connect with API gateway 306 via any suitable network or combination of networks such as the Internet, etc. and use any suitable communication protocols such as Wi-Fi, Bluetooth, etc. Service infrastructure 300 may be built on the basis of cloud computing. API gateway 306 provides access to client applications like experience encapsulation system 310. API gateway 306 receives service requests issued by client applications, and creates service lookup requests based on service requests. As a non-limiting example, in an embodiment, the user device 304 executes a routine to initiate transmission of an audio and/or video feed from the web conference system 312 to the experience encapsulation system 310 for experience encapsulation processing.

In the illustrated embodiment, service infrastructure 300 includes a service registry 308. In some embodiments, service registry 308 looks up service instances of experience encapsulation system 310 in response to a service lookup request such as one from API gateway 306 in response to a service request from user device 304. For example, in some embodiments, the service registry 308 looks up service instances of experience encapsulation system 310 in response to requests related to experience encapsulation processing from the user device 304.

In some embodiments, the service infrastructure 300 includes one or more instances of the experience encapsulation system 310. In some such embodiments, each of the multiple instances of the experience encapsulation system 310 run independently on multiple computing systems. In some such embodiments, experience encapsulation system 310, as well as other service instances of experience encapsulation system 310, are registered in service registry 308.

In some embodiments, service registry 308 maintains information about the status or health of each service instance including performance information associated each of the service instances. For example, as described in more detail herein, such performance information may include various types of performance characteristics of a given service instance (e.g., cache metrics, etc.). As described in more detail herein, extended service registry 308 ranks service instances based on their respective performance characteristics, and selects top-ranking service instances for service discovery or service lookup requests. In the event that a service instance becomes unresponsive or, unhealthy, the service registry will no longer provide its address or information about this service instance to other services.

Figure 4:
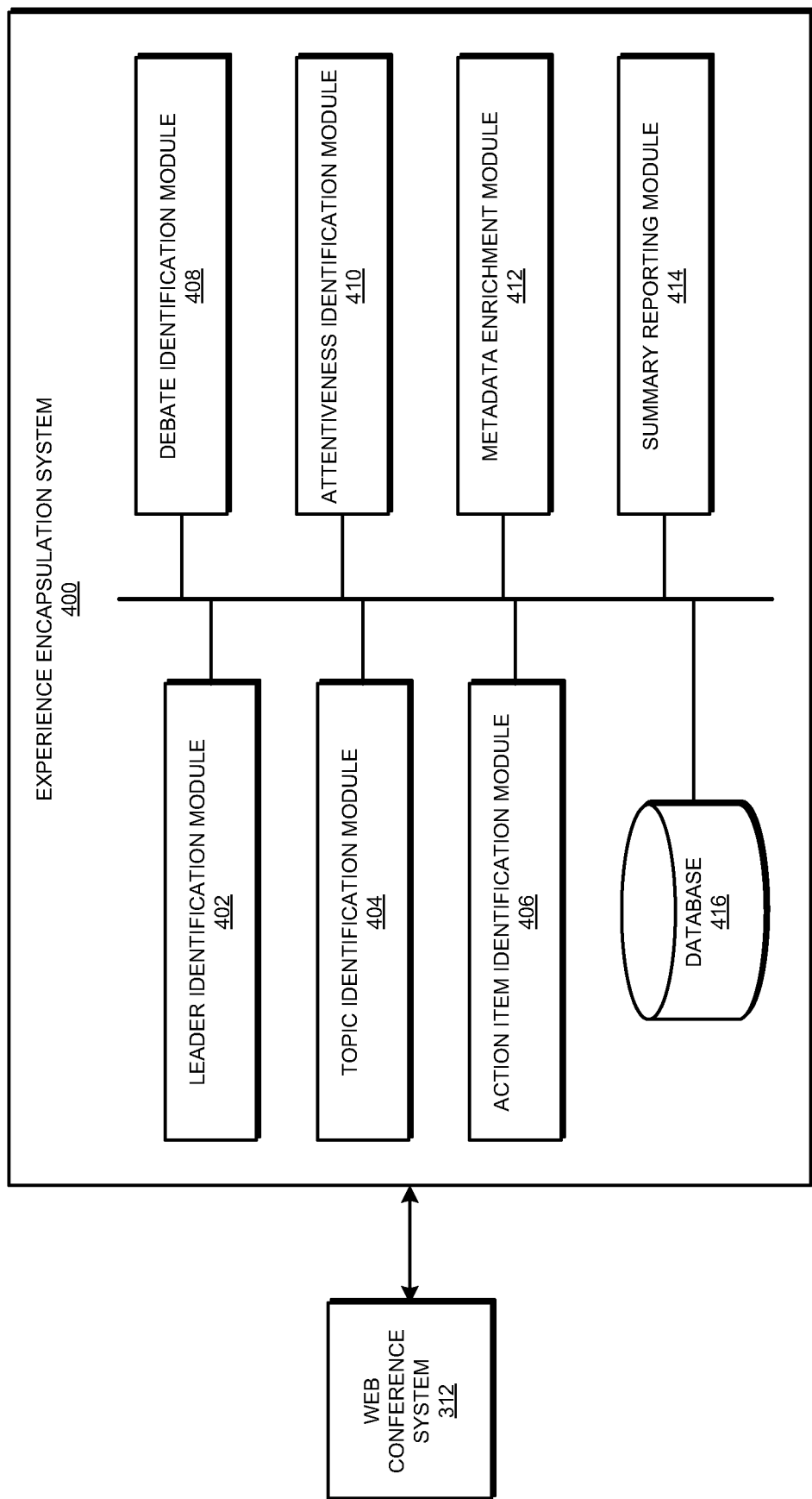
FIG. 4 depicts a block diagram of an experience encapsulation system in accordance with an illustrative embodiment.

With reference to FIG. 4, this figure depicts a block diagram of an experience encapsulation system 400 in accordance with an illustrative embodiment. In a particular embodiment, experience encapsulation system 400 is an example of experience encapsulation system 310 of FIG. 3.

In some embodiments, the experience encapsulation system 400 includes a leader identification module 402, a topic identification module 404, an action item identification module 406, a debate identification module 408, an attentiveness identification module 410, a metadata enrichment module 412, and a summary reporting module 414. In alternative embodiments, the experience encapsulation system 400 can include some or all of the functionality described herein but grouped differently into one or more modules. In some embodiments, the functionality described herein is distributed among a plurality of systems, which can include combinations of software and/or hardware based systems, for example Application-Specific Integrated Circuits (ASICs), computer programs, or smart phone applications.

In the illustrated embodiment, the experience encapsulation system 400 leverages artificial intelligence (AI) techniques on audio or video data acquired during meetings to perform various administrative tasks. The administrative tasks include tasks performed on during or after a meeting to update various types of administrative data. The AI techniques used by various embodiments of the experience encapsulation system 400 include using AI processing of digital recordings of meetings. For example, some embodiments of the experience encapsulation system 400 perform AI processing of digital recordings that includes using AI processing by the leader identification module 402 to identify meeting participants that have leadership roles, using AI processing by the topic identification module 404 to identify topics discussed during meetings, using AI processing by the action item identification module 406 to identify action items discussed during meetings, using AI processing by the debate identification module 408 to identify opinions expressed during meetings, and using AI processing by the attentiveness identification module 410 to detect the attentiveness of meeting participants during meetings. Also, some embodiments of the experience encapsulation system 400 use the metadata enrichment module 412 to find media items related to action items that might be helpful to the meeting participants in performing the associated tasks and use the summary reporting module 414 to generate reports using results from the AI processing by the modules of the experience encapsulation system 400. Some embodiments of the experience encapsulation system 400 also store data resulting from the AI processing by the modules of the experience encapsulation system 400 in a database 416.

Figure 5:
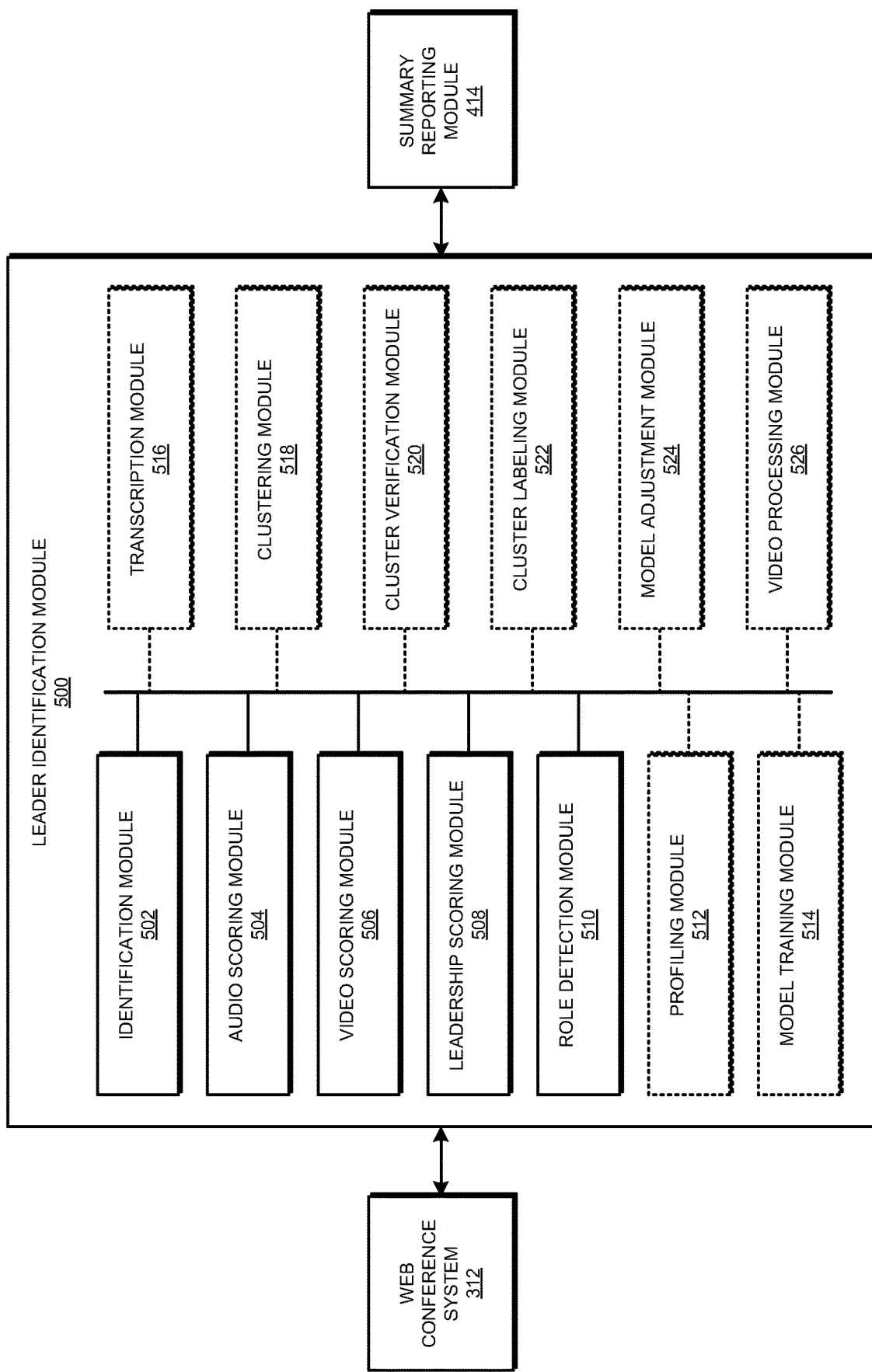
FIG. 5 depicts a block diagram of leader identification module in accordance with an illustrative embodiment.

With reference to FIG. 5, this figure depicts a block diagram of leader identification module 500 in accordance with an illustrative embodiment. In a particular embodiment, leader identification module 500 is an example of leader identification module 402 of FIG. 4.

In some embodiments, the leader identification module 500 includes an identification module 502, an audio scoring module 504, a video scoring module 506, a leadership scoring module 508, and a role detection module 510. Various embodiments of the leader identification module 500 may also include one or more of a profiling module 512, a model training module 514, a transcription module 516, a clustering module 518, a cluster verification module 520, a cluster labeling module 522, a model adjustment module 524, and a video processing module 526. In alternative embodiments, the leader identification module 500 can include some or all of the functionality described herein but grouped differently into one or more modules. In some embodiments, the functionality described herein is distributed among a plurality of systems, which can include combinations of software and/or hardware based systems, for example Application-Specific Integrated Circuits (ASICs), computer programs, or smart phone applications.

In the illustrated embodiment, the leader identification module 500 provides AI processing of digital recordings of meetings to identify meeting participants that have leadership roles. For example, in the illustrated embodiment, the leader identification module 500 receives an audio or video signal of a meeting from web conference system 312 either during or after the meeting. The audio or video signal is stored as a digital recording where it can be accessed by the leader identification module 500.

In some embodiments, the leader identification module 500 receives digital recordings that have already been partitioned into clusters of segments. For example, in some embodiments, a digital recording undergoes a speaker diarization process of partitioning an input audio stream into clusters of segments according to speaker identity.

Alternatively, in some embodiments, the leader identification module 500 includes a clustering module 518 that receives or accesses digital recordings of meetings and partitions the recordings into clusters of segments. In some embodiments, the clustering module 518 performs a speaker diarization process of partitioning a digital recording into clusters of segments according to speaker identity. Embodiments of the clustering module 518 may use any of a variety of technologies to partition digital recordings of meetings into speaker-based clusters. As a non-limiting example, some embodiments of the clustering module 518 process a digital recording of a meeting to partition the recording into clusters and group the clusters into hypothesized speakers using a machine-learning clustering scheme, such as Agglomerative Hierarchical Clustering (AHC) or Spectral clustering (SC).

In some embodiments, the leader identification module 500 includes additional clustering support modules for testing and performing administrative tasks related to the clusters created by the clustering module 518. For example, in some embodiments, the leader identification module 500 includes a cluster verification module 520, a cluster labeling module 522, and/or a model adjustment module 524.

In the illustrated embodiment, the cluster verification module 520 verifies that the number of clusters is equal to the number of meeting participants that spoke during the meeting. If the cluster verification module 520 detects that the plurality of clusters is not equal in number to the plurality of participants, the cluster verification module 520 signals the clustering module 518 to repeat the clustering process in a different manner to correct the mismatch between the number of clusters and the number of speaking meeting participants.

In some embodiments, the leader identification module 500 includes both the cluster verification module 520 and the model adjustment module 524, and the leader identification module 500 controls the clustering module 518, cluster verification module 520, and model adjustment module 524 to perform a model adjustment process until the number of clusters is satisfactory. In some embodiments, the model adjustment process includes performing one or more iterations of (a) controlling the model adjustment module 524 to adjust model parameters used for clustering, (b) controlling the clustering module 518 to use the parameters to partition a recording into clusters, and (c) controlling the cluster verification module 520 to determine whether the number of clusters is satisfactory; if not, the process is repeated; if so, the process ends.

In some such embodiments, the cluster verification module 520 receives the initially-clustered digital recording from the clustering module 518 and determines whether the number of clusters is satisfactory. If not, then the leader identification module 500 initiates the model adjustment process. In some such embodiments, the cluster verification module 520 determines the number of clusters to be satisfactory if the number of clusters is the same as the number of meeting participants who spoke while the meeting was being recorded. In some such embodiments, the cluster verification module 520 determines the number of meeting participants who spoke while the meeting was being recorded in a variety of ways, for example from user input or as metadata that accompanies the recording of the meeting. In some embodiments, the cluster verification module 520 receives a number of meeting participants and uses this as the number of speakers based on an underlying presumption that each meeting participant spoke at least once.

If the cluster verification module 520 determines that number of clusters is not satisfactory, this result triggers the model adjustment module 524 to adjust one or more parameters of the model used by the clustering module 518 for the machine-learning clustering scheme. There are a variety of clustering schemes that may be used in actual implementations, so the actual model parameters, parameter values, and parameter adjustments are implementation specific.

Once the model adjustment module 524 has completed the parameter adjustment, this triggers the clustering module 518 to repeat the clustering of the digital recording of a meeting. The clustering module 518 then provides the number of clusters to the clustering module 518 to again determine whether the number of clusters is satisfactory. If not, then the parameters are readjusted and the recording is re-clustered again, and this continues until the number of clusters is satisfactory.

The identification module 502 receives or accesses digital recordings of meetings to associate audio from the meeting with meeting participants. The audio in digital recordings of meetings will primarily include recordings of meeting participants speaking during the meeting. The identification module 502 uses AI processing to identify which meeting participant is speaking and associate the speaking participant with the recording. In some embodiments, the identification module 502 processes individual clusters of digital recordings after the recordings have been partitioned into clusters of segments according to speaker identity. As the identification module 502 processes a cluster, it identifies which meeting participant is speaking in the cluster and associate the speaking participant with that cluster of the recording.

Embodiments of the identification module 502 may use any of a variety of automatic speech recognition technologies that enable the recognition of spoken language into text by computers. As an example, some embodiments of the identification module 502 use Natural language processing (NLP) technology, such as a Hidden Markov Model (HMM) or a Deep Neural Network (DNN).

In the illustrated embodiment, the leader identification module 500 includes a transcription module 516 that analyzes the audio of a digital recording of a meeting, including using speech recognition technology to retrieve the speech content of the audio. In some embodiments, the transcription module 516 uses speech-to-text NLP algorithms to generate a text transcription of the incoming audio. The transcription module 516 then provides the text transcription to the identification module 502, as well as any other modules that may make use of the text transcription. In some embodiments, the transcription module 516 stores the text transcription in memory, such as the database 416 of FIG. 4.

The identification module 502 receives or accesses the text transcription generated by the transcription module 516 and uses a DNN to process the text transcription, for example by extracting features of the dialogue (e.g., to identify tone, sentiment, etc.), eliminating noise, and identifying references to the identity of the speaker. Non-limiting examples of references to the speaker's identity that the DNN may extract include a self-introduction by the speaker or a response by the speaker to a prompt from another meeting participant (e.g., asking a question or inviting to begin a presentation) where the prompt includes identity information. In some embodiments, the identification module 502 stores the speaker names associated with each cluster in memory, such as the database 416 of FIG. 4.

In the illustrated embodiment, the leader identification module 500 includes a cluster labeling module 522. In some embodiments, the cluster labeling module 522 generates metadata or header data for each cluster. In some embodiments, the data added by the cluster labeling module 522 is based on system settings, which may be set according to default or user preferences. In some embodiments, the cluster labeling module 522 receives the speaker identity information from the identification module 502 and associates the speaker identity information with the respective associated cluster, for example as metadata or header data.

In the illustrated embodiment, the audio scoring module 504 generates a first preliminary leadership score for each of the meeting participants based on audio features in the digital recording of the incoming audio. In some embodiments, the audio scoring module 504 generates a first preliminary leadership score for each of the meeting participants on a cluster by cluster basis, such that the audio scoring module 504 processes one of the clusters generated by the clustering module 518 at a time. In some such embodiments, the audio scoring module 504 receives or accesses a cluster for scoring, generates first preliminary leadership score for that cluster, and associates the generated first preliminary leadership score the meeting participant associated with the cluster (e.g., based on speaker identity information that the cluster labeling module 522 associated with the cluster).

In the illustrated embodiment, the leader identification module 500 includes a profiling module 512, and the audio scoring module 504 generates a first preliminary leadership score for each of the meeting participants based on audio features as determined by the profiling module 512. In some embodiments, when the audio scoring module 504 receives or accesses a cluster for scoring, the audio scoring module 504 triggers the profiling module 512 to evaluating that cluster. In some embodiments, the profiling module 512 calculates a speaking duration value for the cluster, for example based on the size of the cluster and information in the technical metadata of the cluster, such as file type or format, bit depth, sample rate, bit depth, and number of tracks. In some embodiments, the profiling module 512 calculates an interjection value for the cluster, for example based on the number of interjections detected in the cluster. For example, in some embodiments, the 512 detects instances of multiple participants speaking at the same time in the audio and filters those to include only instances where the speaker of the current cluster is beginning to speak while another participant has been speaking, and those instances remaining are identified as an interruption and counted as an interjection.

In some embodiments, the profiling module 512 provides audio feature information to the audio scoring module 504 for each cluster as the profiling module 512. For example, the audio feature information may include one or more values based at least in part on the speaking duration and/or interjection values determined by the profiling module 512. In such embodiment, the audio scoring module 504 generates the first preliminary leadership score based on the audio feature information received by the profiling module 512. In some embodiments, the audio scoring module 504 uses the amount of time speaking and/or the number of interjections as a first preliminary leadership score for each meeting participant. In some embodiments, the audio scoring module 504 uses the amount of time speaking and/or the number of interjections to calculate a first preliminary leadership score, for example by accounting for the total length of the meeting in order to normalize the scores across a series of meetings having different durations. In some embodiments, the audio scoring module 504 stores the first preliminary leadership score for each meeting participant in memory, such as the database 416 of FIG. 4.

In the illustrated embodiment, the video scoring module 506 generates a second preliminary leadership score for each of the meeting participants based AI processing of video elements of the digital recording of a meeting. The video scoring module 506 receives or accesses video segments from the digital recording of the meeting and synchronizes the video segments with the segmented audio from the digital recording.

In the illustrated embodiment, the video scoring module 506 receives the video segments from the video processing module 526. In some such embodiments, the video processing module 526 partitions video from the digital recording of the meeting into a plurality of video segments. In some embodiments, the video processing module 526 partitions the video such that the segments are temporally aligned with the clusters generated by the clustering module 518. In some such embodiments, the video processing module 526 receives the speaker identity information from the identification module 502 for each cluster, associates the speaker identity information with the video segments based on the speaker associated with the corresponding audio cluster, for example as metadata or header data of each video segment.

In some embodiments, the video scoring module 506 evaluates each video segment using a DNN or other processes to output respective scores indicative of the associated participant's role (e.g., leader or non-leader role). In some such embodiments, the DNN includes a machine learning classifier model that is trained by model training module 514. In some embodiments, the model training module 514 trains the machine learning classifier model using training data that includes features of video of a past meetings. For example, in some such embodiments, the model training module 514 uses a meeting corpus to identify visual indicators in the video frames of meeting participants that causes them to be classified as having leadership roles or non-leadership roles.

In some embodiments, video scoring module 506 uses the output score from the DNN as a second preliminary leadership score for each meeting participant. In some embodiments, the video scoring module 506 uses the output score from the DNN to calculate a second preliminary leadership score, for example by accounting for the total length of the meeting in order to normalize the scores across a series of meetings having different durations. In some embodiments, the video scoring module 506 stores the second preliminary leadership score for each meeting participant in memory, such as the database 416 of FIG. 4.

In the illustrated embodiment, the leadership scoring module 508 calculates a final leadership score for each meeting participant based on the participant's first preliminary leadership score from the audio scoring module 504 and the participant's second preliminary leadership score from the video scoring module 506. The final leadership score is representative of a likelihood that the associated participant is a supervisor or in some other leadership role. In some embodiments, the leadership scoring module 508 calculates the final leadership score based on a weighted average of the first preliminary leadership score and the second preliminary leadership score. The leadership scoring module 508 then stores the results for each participant in memory, such as the database 416 of FIG. 4.

In the illustrated embodiment, the role detection module 510 evaluates the leadership score for each meeting participant to determine how to classify them. In some embodiments, the role detection module 510 compares the final leadership score from the leadership scoring module 508 to a threshold value, and the outcome of the comparison is indicative of whether the participant is classified as a leader or non-leader. In some embodiments, the threshold value is preset or hard-coded in the role detection module. Alternatively, in some embodiments, a user can set or adjust the threshold value.

In the illustrated embodiment, the summary reporting module 414 generates a supervisory report that includes a summary of the meeting for which the leader identification module 500 has been processing a digital recording. In an embodiment, the supervisory report is only sent or made available to meeting participants identified as leaders by the role detection module 510. In some embodiments, the role detection module 510 provides the list of participants identified as leaders to the summary reporting module 414, which in turn sends supervisory reports, or notifications of the availability of supervisory reports, to participants on the list from the role detection module 510.

Figure 6:
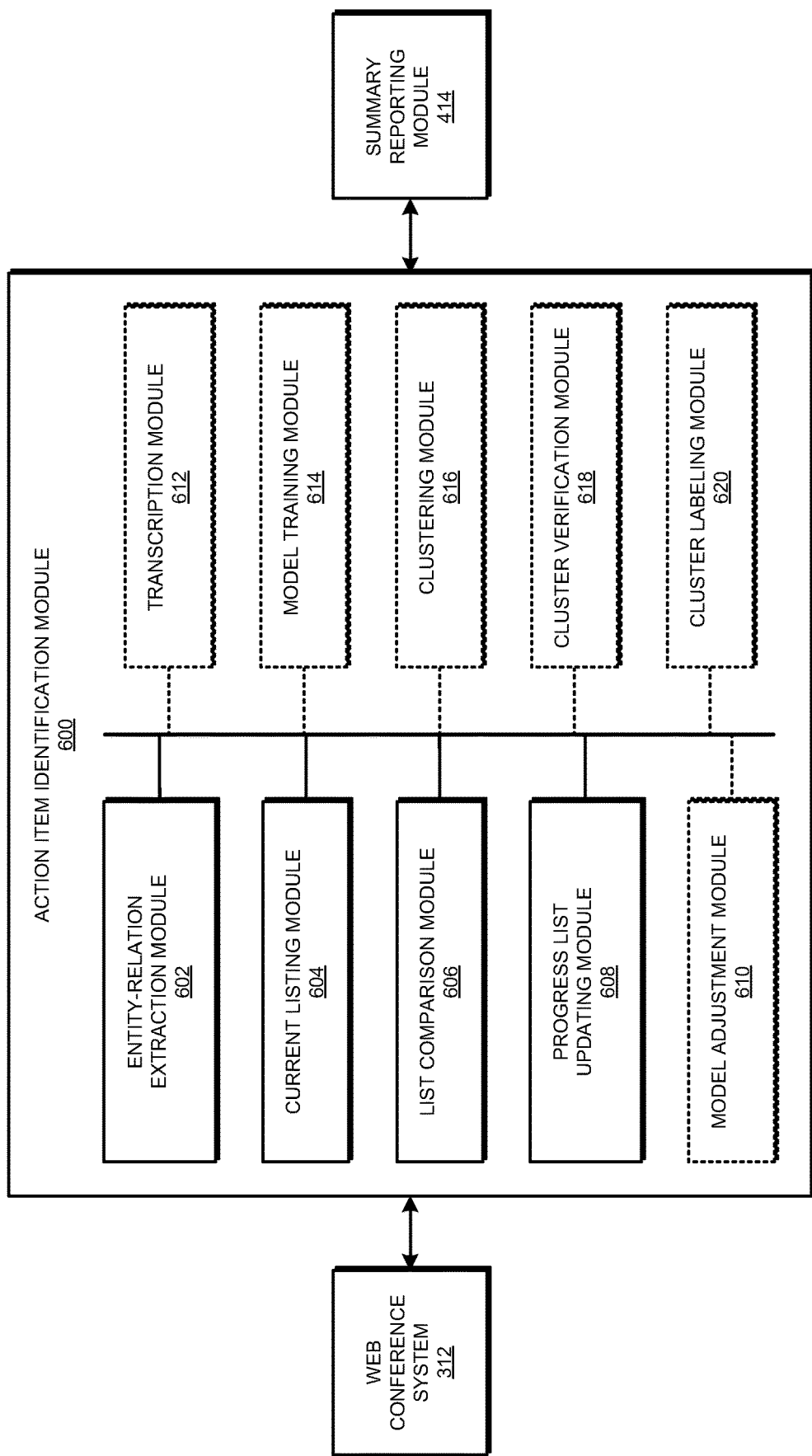
FIG. 6 depicts a block diagram of an action item identification module in accordance with an illustrative embodiment.

With reference to FIG. 6, this figure depicts a block diagram of an action item identification module 600 in accordance with an illustrative embodiment. In a particular embodiment, the action item identification module 600 is an example of the action item identification module 406 of FIG. 4.

In some embodiments, the action item identification module 600 includes an entity-relation extraction module 602, a current listing module 604, a list comparison module 606, and a progress list updating module 608. Various embodiments of the action item identification module 600 may also include one or more of a model adjustment module 610, a transcription module 612, a model training module 614, a clustering module 616, a cluster verification module 618, and a cluster labeling module 620. In alternative embodiments, the action item identification module 600 can include some or all of the functionality described herein but grouped differently into one or more modules. In some embodiments, the functionality described herein is distributed among a plurality of systems, which can include combinations of software and/or hardware based systems, for example Application-Specific Integrated Circuits (ASICs), computer programs, or smart phone applications.

In the illustrated embodiment, the action item identification module 600 provides AI processing of digital recordings of meetings to identify action items discussed during meetings. In some embodiments, the action item identification module 600 keeps track of the life cycle of action items across multiple meetings. In the illustrated embodiment, the action item identification module 600 receives an audio or video signal of a meeting from web conference system 312 either during or after the meeting. The audio or video signal is stored as a digital recording where it can be accessed by the action item identification module 600.

In some embodiments, the action item identification module 600 receives digital recordings that have already been partitioned into clusters of segments. For example, in some embodiments, a digital recording undergoes a speaker diarization process of partitioning an input audio stream into clusters of segments according to speaker identity.

Alternatively, in some embodiments, the action item identification module 600 includes a clustering module 616 that receives or accesses digital recordings of meetings and partitions the recordings into clusters of segments. In some embodiments, the clustering module 616 performs a speaker diarization process of partitioning a digital recording into clusters of segments according to speaker identity. Embodiments of the clustering module 616 may use any of a variety of technologies to partition digital recordings of meetings into speaker-based clusters. As a non-limiting example, some embodiments of the clustering module 616 process a digital recording of a meeting to partition the recording into clusters and group the clusters into hypothesized speakers using a machine-learning clustering scheme, such as Agglomerative Hierarchical Clustering (AHC) or Spectral clustering (SC).

In some embodiments, the action item identification module 600 includes additional clustering support modules for testing and performing administrative tasks related to the clusters created by the clustering module 616. For example, in some embodiments, the action item identification module 600 includes a cluster verification module 618, a cluster labeling module 620, and/or a model adjustment module 610.

In the illustrated embodiment, the cluster verification module 618 verifies that the number of clusters is equal to the number of meeting participants that spoke during the meeting. If the cluster verification module 618 detects that the plurality of clusters is not equal in number to the plurality of participants, the cluster verification module 618 signals the clustering module 616 to repeat the clustering process in a different manner to correct the mismatch between the number of clusters and the number of speaking meeting participants.

In some embodiments, the action item identification module 600 includes both the cluster verification module 618 and the model adjustment module 610, and the action item identification module 600 controls the clustering module 616, cluster verification module 618, and model adjustment module 610 to perform a model adjustment process until the number of clusters is satisfactory. In some embodiments, the model adjustment process includes performing one or more iterations of (a) controlling the model adjustment module 610 to adjust model parameters used for clustering, (b) controlling the clustering module 616 to use the parameters to partition a recording into clusters, and (c) controlling the cluster verification module 618 to determine whether the number of clusters is satisfactory; if not, the process is repeated; if so, the process ends.

In some such embodiments, the cluster verification module 618 receives the initially-clustered digital recording from the clustering module 616 and determines whether the number of clusters is satisfactory. If not, then the action item identification module 600 initiates the model adjustment process. In some such embodiments, the cluster verification module 618 determines the number of clusters to be satisfactory if the number of clusters is the same as the number of meeting participants who spoke while the meeting was being recorded. In some such embodiments, the cluster verification module 618 determines the number of meeting participants who spoke while the meeting was being recorded in a variety of ways, for example from user input or as metadata that accompanies the recording of the meeting. In some embodiments, the cluster verification module 618 receives a number of meeting participants and uses this as the number of speakers based on an underlying presumption that each meeting participant spoke at least once.

If the cluster verification module 618 determines that number of clusters is not satisfactory, this result triggers the model adjustment module 610 to adjust one or more parameters of the model used by the clustering module 616 for the machine-learning clustering scheme. There are a variety of clustering schemes that may be used in actual implementations, so the actual model parameters, parameter values, and parameter adjustments are implementation specific.

Once the model adjustment module 610 has completed the parameter adjustment, this triggers the clustering module 616 to repeat the clustering of the digital recording of a meeting. The clustering module 616 then provides the number of clusters to the clustering module 616 to again determine whether the number of clusters is satisfactory. If not, then the parameters are readjusted and the recording is re-clustered again, and this continues until the number of clusters is satisfactory.

In some embodiments, the entity-relation extraction module 602 receives or accesses digital recordings of meetings and uses AI processing to identify a set of designated entities and a set of relationships between designated entities from speech content of the digital recordings. For example, in some embodiments, the set of designated entities comprises participants, tasks, and dates. Also, in some embodiments, the set of relationships between designated entities comprises associations between tasks and participants and associations between tasks and dates. In some embodiments, the entity-relation extraction module 602 processes individual clusters of digital recordings after the recordings have been partitioned into clusters of segments according to speaker identity. As the entity-relation extraction module 602 processes a cluster, it identifies which meeting participant is speaking in the cluster and associate the speaking participant with that cluster of the recording.

Embodiments of the entity-relation extraction module 602 may use any of a variety of automatic speech recognition technologies that enable the recognition of spoken language into text by computers. For example, some embodiments of the entity-relation extraction module 602 use Named-Entity Recognition (NER) processing using statistical modeling, such as maximum entropy (MaxEnt) or conditional random fields (CRF), to locate and classify named entities mentioned in the text of each cluster. In some embodiments, the entity-relation extraction module 602 uses Natural language processing (NLP) technology, such as a Hidden Markov Model (HMM) or a Deep Neural Network (DNN).

In the illustrated embodiment, the leader identification module 500 includes a transcription module 612 that analyzes the audio of a digital recording of a meeting, including using speech recognition technology to retrieve the speech content of the audio. In some embodiments, the transcription module 612 uses speech-to-text NLP algorithms to generate a text transcription of the incoming audio. The transcription module 612 then provides the text transcription to the entity-relation extraction module 602, as well as any other modules that may make use of the text transcription. In some embodiments, the transcription module 612 stores the text transcription in memory, such as the database 416 of FIG. 4.

The entity-relation extraction module 602 receives or accesses the text transcription generated by the transcription module 516 and uses a DNN to process the text transcription, for example by classifying parts of speech content, eliminating noise, and identifying references to action items. Non-limiting examples of references to action items that the DNN may extract include references to participants, tasks, and/or dates. In some embodiments, the entity-relation extraction module 602 stores the extracted data associated with action items in memory, such as the database 416 of FIG. 4.

In some such embodiments, the DNN includes a machine learning classifier model that is trained by model training module 614. In some embodiments, the model training module 614 trains the machine learning classifier model using training data that includes features of audio of a past meetings. For example, in some such embodiments, the model training module 614 uses a meeting corpus to identify audio indicators in the audio of meeting participants that causes them to be classified as an entity (e.g., participants, tasks, and dates) or an indicator of a relationship between entities (e.g., associations between tasks and participants and associations between tasks and dates).

In the illustrated embodiment, the action item identification module 600 includes a cluster labeling module 620. In some embodiments, the cluster labeling module 620 generates metadata or header data for each cluster. In some embodiments, the data added by the cluster labeling module 620 is based on system settings, which may be set according to default or user preferences. In some embodiments, the cluster labeling module 620 receives the speaker identity information from the leader identification module 500 and associates the speaker identity information with the respective associated cluster, for example as metadata or header data.

In some embodiments, the current listing module 604 generate a list of current action items based on the extracted set of designated entities and the set of relationships between designated entities. The current listing module 604 then provides this current action items list to the list comparison module 606.

In some embodiments, the list comparison module 606 identifies which action items on the current action items list are also on a progress list, which is a list of ongoing action items from past meetings prior to the current meeting. In some embodiments, the list comparison module 606 also identifies which action items on the current action items list are not on the progress list.

In some embodiments, the progress list updating module 608 updates the progress list based on the results of the processing by the list comparison module 606. The progress list updating module 608 updates the progress list updating action items identified by the list comparison module 606 as being both on the current action items list and on the progress list such that the progress list has updates from the current meeting. The remaining action items are considered new action items, so the progress list updating module 608 updates the progress list by adding the new action items to the progress list.

In the illustrated embodiment, the summary reporting module 414 generates a supervisory report that includes a summary of the meeting for which the action item identification module 600 has been processing a digital recording. In an embodiment, the supervisory report is only sent or made available to meeting participants identified as leaders by the leader identification module 500. In some embodiments, the supervisory report includes a summary of the action items on the progress list, including a summary of updates made to the progress list by the action item identification module 600.

Figure 7:
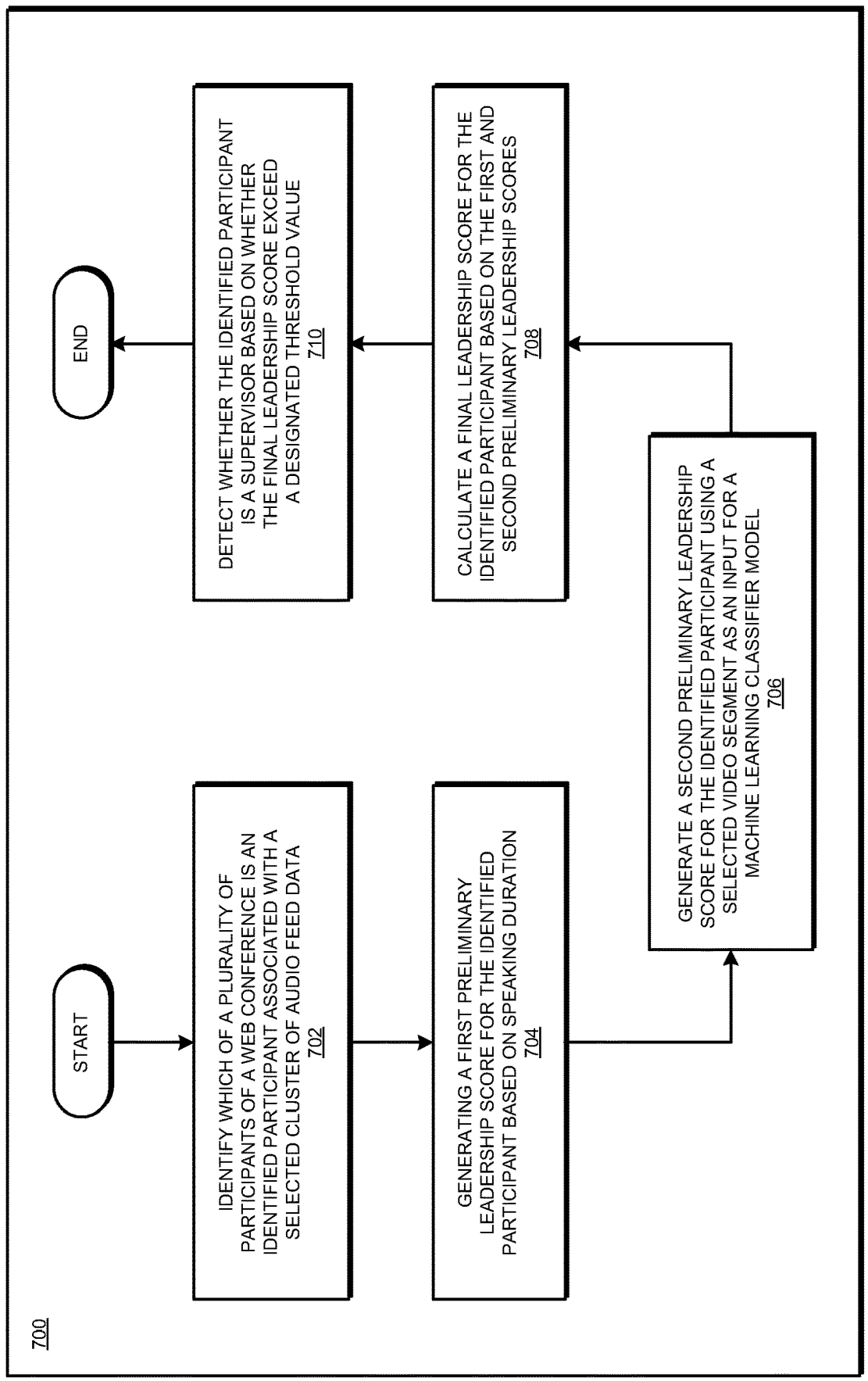
FIG. 7 depicts a flowchart of an example process for identifying meeting participants that have leadership roles from a digital recording of a meeting in accordance with an illustrative embodiment.

With reference to FIG. 7 this figure depicts a flowchart of an example process 700 for identifying meeting participants that have leadership roles from a digital recording of a meeting in accordance with an illustrative embodiment. In a particular embodiment, the leader identification module 402 or the leader identification module 500 carries out the process 700.

In an embodiment, at block 702, the process identifies which of a plurality of participants of a web conference is an identified participant associated with a selected cluster of audio feed data. Next, at block 704, the process generates a first preliminary leadership score for the identified participant based on speaking duration. Next, at block 706, the process generates a second preliminary leadership score for the identified participant using a selected video segment as an input for a machine learning classifier model. Next, at block 708, the process calculates a final leadership score for the identified participant based on the first and second preliminary leadership scores. Next, at block 710, the process detects whether the identified participant is a supervisor based on whether the final leadership score exceeds a designated threshold value.

Figure 8:
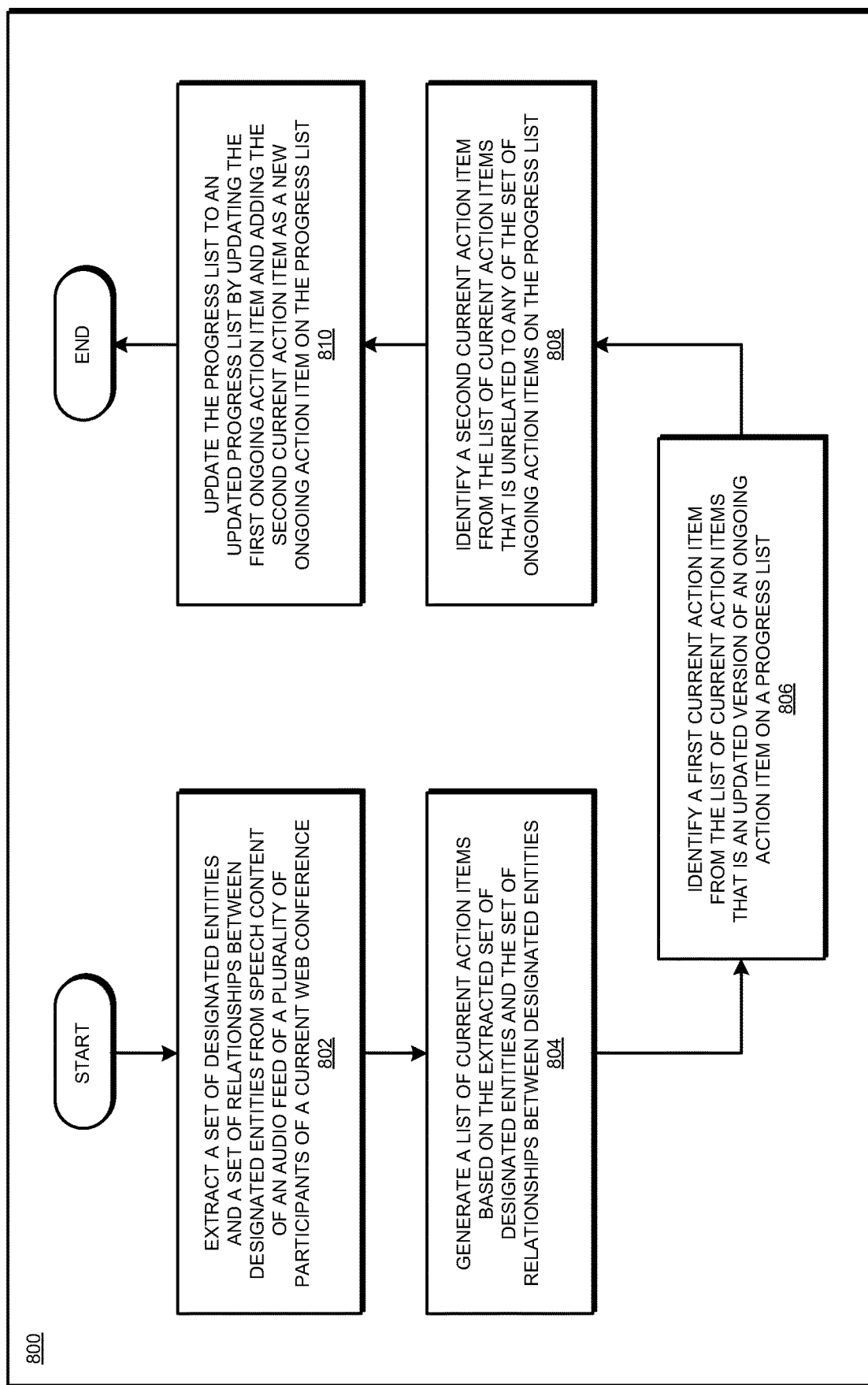
FIG. 8 depicts a flowchart of an example process for identifying action items that are new or updates to ongoing action items from a digital recording of a meeting in accordance with an illustrative embodiment.

With reference to FIG. 8 this figure depicts a flowchart of an example process 800 for identifying action items that are new or updates to ongoing action items from a digital recording of a meeting in accordance with an illustrative embodiment. In a particular embodiment, the action item identification module 406 or the action item identification module 600 carries out the process 800.

In an embodiment, at block 802, the process extracts a set of designated entities and a set of relationships between designated entities from speech content of an audio feed of a plurality of participants of a current web conference. Next, at block 804, the process generates a list of current action items based on the extracted set of designated entities and the set of relationships between designated entities. Next, at block 806, the process identifies a first current action item from the list of current action items that is an updated version of an ongoing action item on a progress list. Next, at block 808, the process identifies a second current action item from the list of current action items that is unrelated to any of the set of ongoing action items on the progress list. Next, at block 810, the process updates the progress list to an updated progress list by updating the first ongoing action item and adding the second current action item as a new ongoing action item on the progress list.

Figure 9:
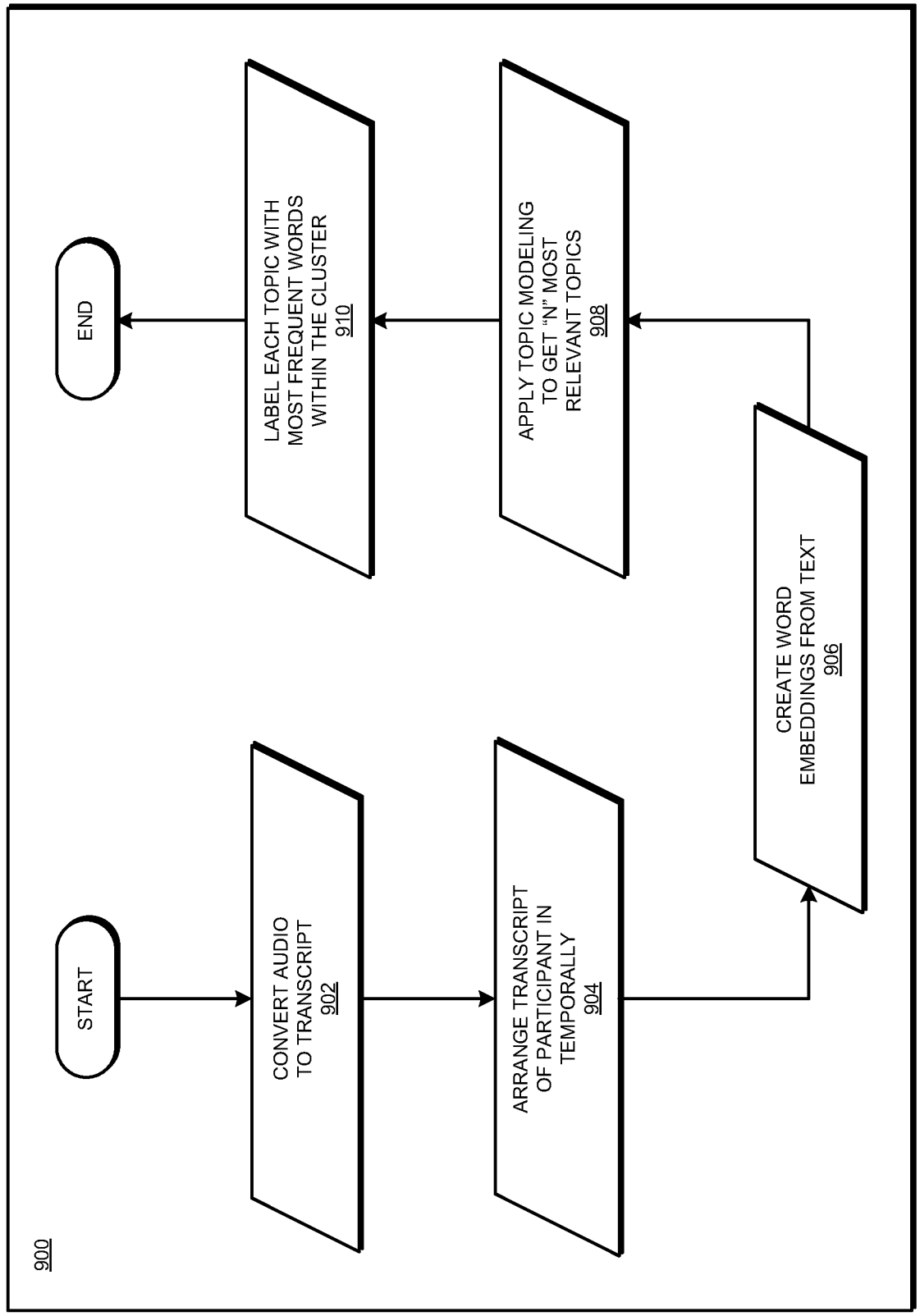
FIG. 9 depicts a flowchart of an example process for identifying topics from a digital recording of a meeting in accordance with an illustrative embodiment.

With reference to FIG. 9 this figure depicts a flowchart of an example process 900 for identifying topics from a digital recording of a meeting in accordance with an illustrative embodiment. In a particular embodiment, the topic identification module 404 carries out the process 900.

In an embodiment, at block 902, the process converts audio from the digital recording of the meeting to a transcript. Next, at block 904, the process arranges the transcript of participants into temporally arranged clusters. Next, at block 906, the process creates word embeddings from the text in the transcript for each cluster. Next, at block 908, the process applies topic modeling to get the n most relevant words. Next, at block 910, the process labels each topic with the most frequent words within the cluster.

Figure 10:
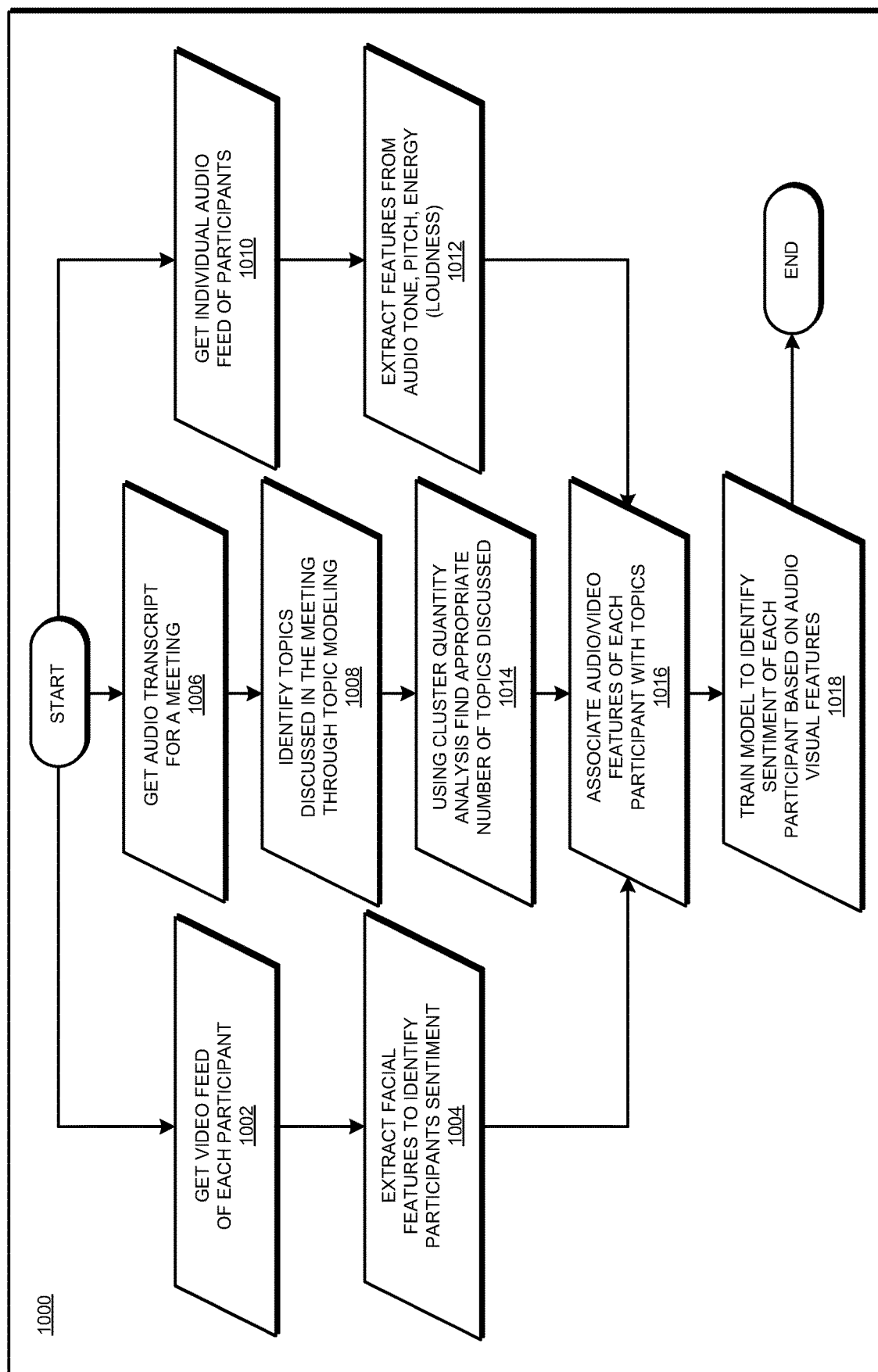
FIG. 10 depicts a flowchart of an example process for identifying debates from a digital recording of a meeting in accordance with an illustrative embodiment.

With reference to FIG. 10 this figure depicts a flowchart of an example process 1000 for identifying debates from a digital recording of a meeting in accordance with an illustrative embodiment. In a particular embodiment, the debate identification module 408 carries out the process 1000.

In an embodiment, at block 1002, the process receives or accesses a video feed of each participant of a certain meeting. Next, at block 1004, the process extracts facial features to identify participant sentiments.

In parallel with blocks 1002 and 1004, at block 1006, the process receives or accesses an audio transcript of the certain meeting. Next, at block 1008, the process identifies topics discussed in the meeting through topic modeling. Next, at block 1014, the process uses cluster quantity analysis to determine a number of topics discussed in the certain meeting.

In parallel with blocks 1002 and 1004, and in parallel with blocks 1006, 1008, and 1014, at block 1010, the process receives or accesses audio clusters that include clusters of audio of respective meeting participants of the certain meeting. Next, at block 1012, the process extracts audio features from the audio clusters, such as audio tome, pitch, and energy (i.e., loudness).

Next, at block 1016, the process associates audio and video features of each meeting participant with topics. Next, at block 1018, the process trains a model to identify the sentiment of each meeting participant based on audio and visual feature.

Figure 11:
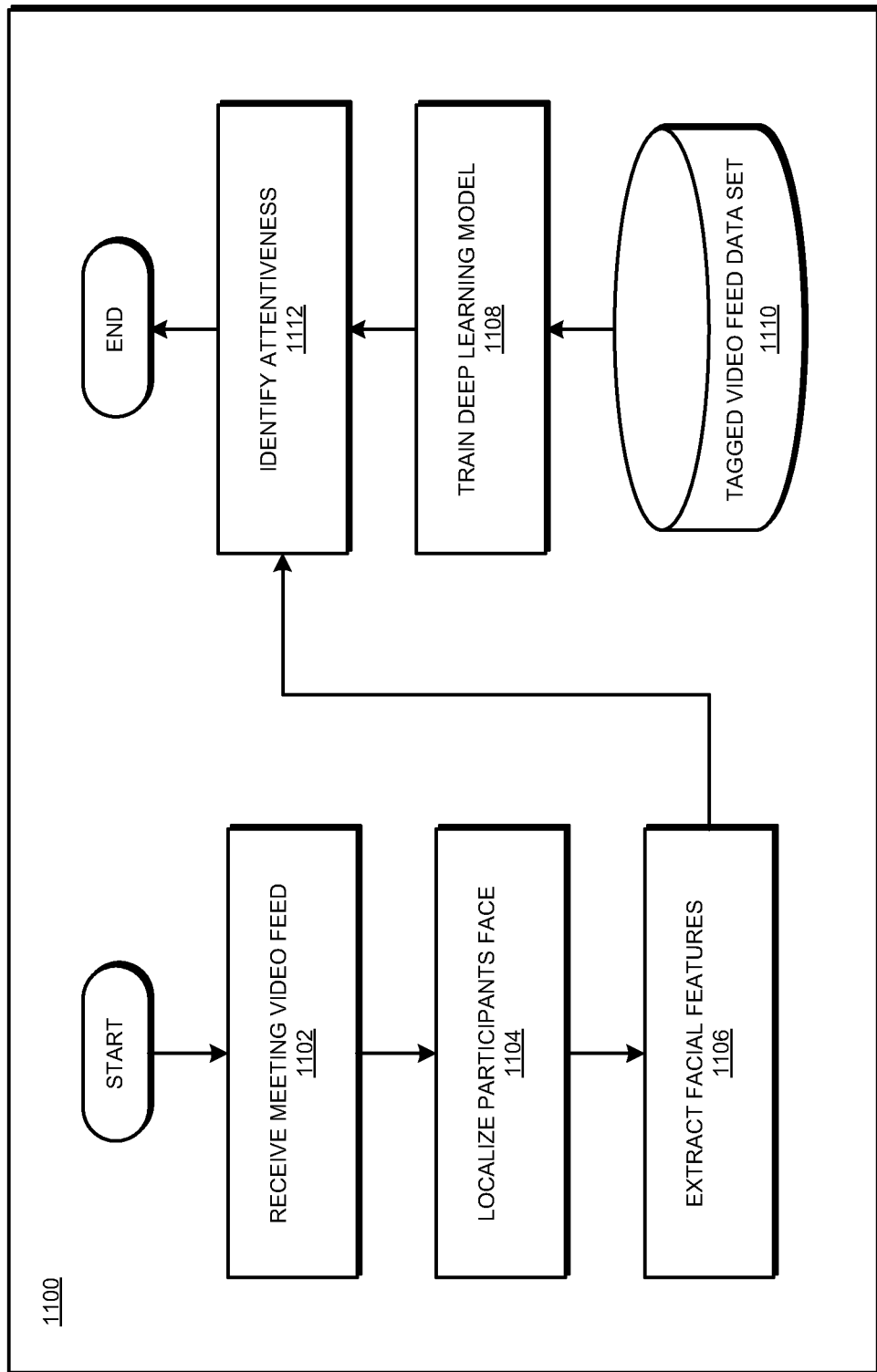
FIG. 11 depicts a flowchart of an example process for identifying the attentiveness of meeting participants from a digital recording of a meeting in accordance with an illustrative embodiment.

With reference to FIG. 11 this figure depicts a flowchart of an example process 1100 for identifying the attentiveness of meeting participants from a digital recording of a meeting in accordance with an illustrative embodiment. In a particular embodiment, the attentiveness identification module 410 carries out the process 1100.

In an embodiment, at block 1102, the process receives video data from the digital recording of a meeting. Next, at block 1104, the process uses AI facial recognition processing to localize faces of meeting participants in the meeting video. Next, at block 1106, the process extracts facial features of the meeting participants from the meeting video. In parallel or prior to blocks 1102, 1104, and 1106, at block 1108, the process trains a deep learning model to determine levels of attentiveness from facial features using training data from a tagged video feed data set 1110. Next, at block 1112, the process uses the trained deep learning model to determine levels of attentiveness of meeting participants during the meeting based on the extracted facial features of the meeting participants.

Figure 12:
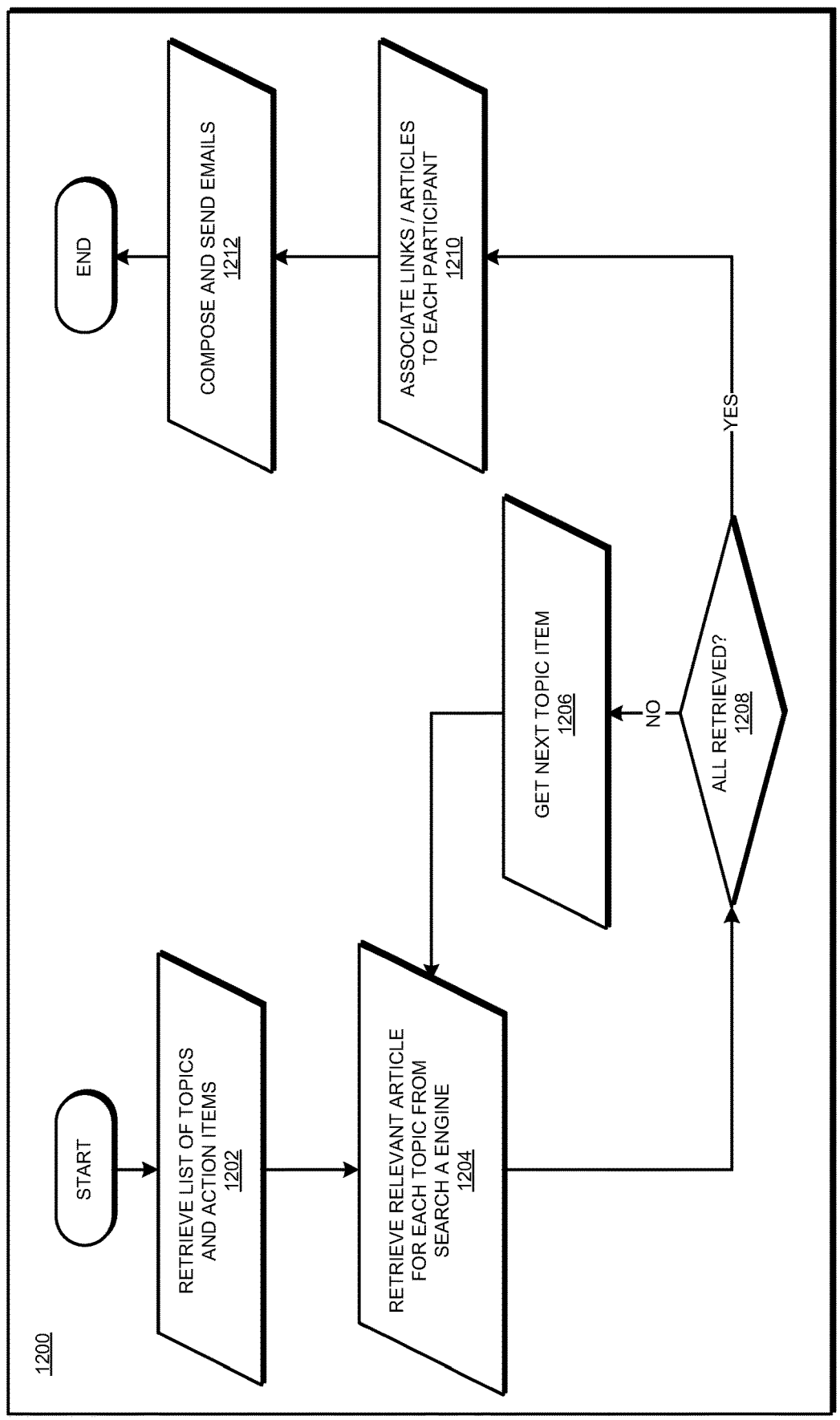
FIG. 12 depicts a flowchart of an example process for providing metadata enrichment for meeting participants based on a digital recording of a meeting in accordance with an illustrative embodiment.

With reference to FIG. 12 this figure depicts a flowchart of an example process 1200 for providing metadata enrichment for meeting participants based on a digital recording of a meeting in accordance with an illustrative embodiment. In a particular embodiment, the metadata enrichment module 412 carries out the process 1200.

In an embodiment, at block 1202, the process retrieves a list of topics and action items, for example from memory as provided by the topic identification module 404 and the action item identification module 406 of FIG. 4.

Next, at block 1204, the process retrieves relevant articles for each topic from search engine results, for example that searches a local intranet or the Internet.

Next, at block 1206, the process determines if relevant articles have ben retrieved for each topic. If not, the process proceeds to the next topic at block 1208 and repeats the process at blocks 1204 and 1206 until all topics have been processed. Next, at block 1210, the process associates links to articles or the articles themselves with meeting participants. Next, at block 1212, the process generates emails to the meeting participants that include the articles or links to the articles.

Figure 13:
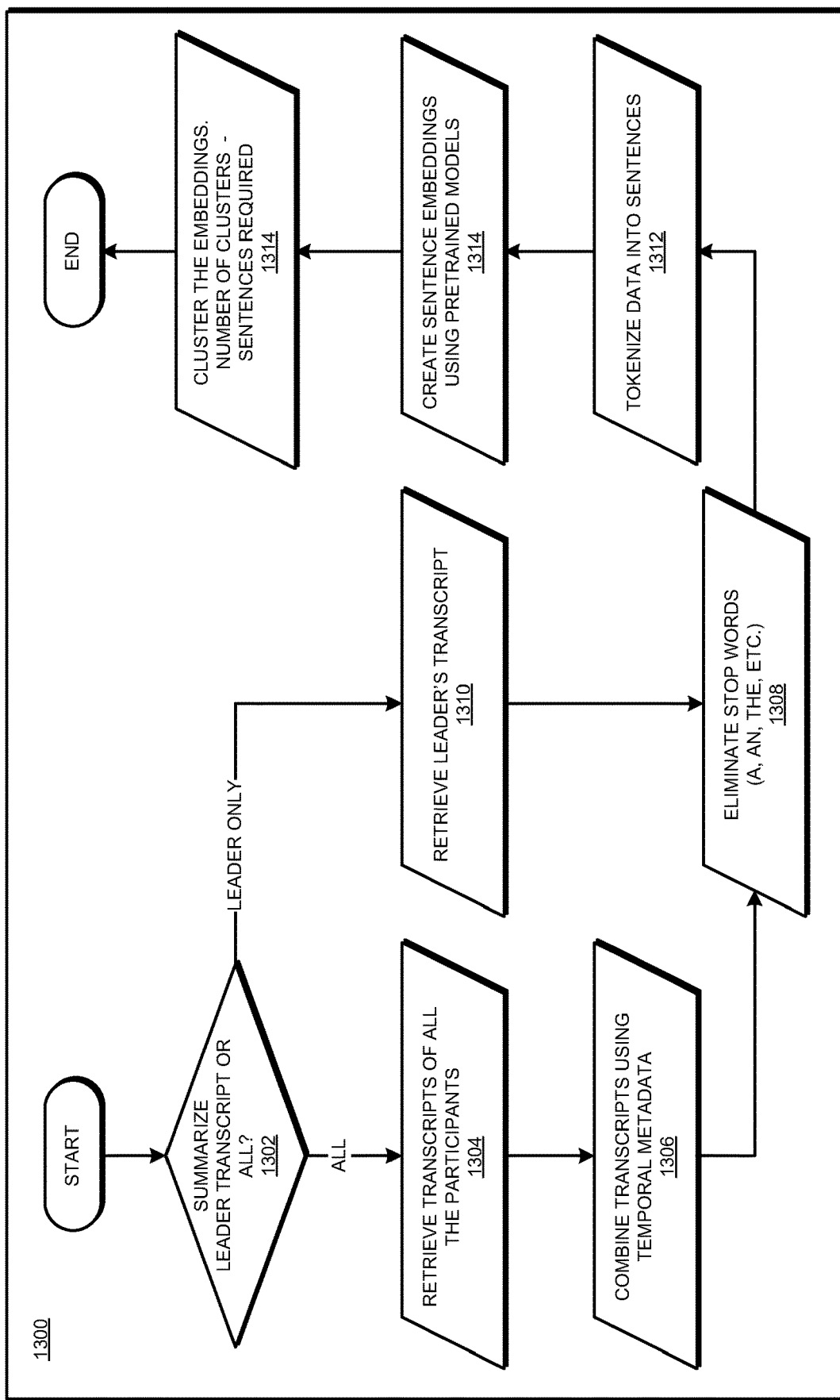
FIG. 13 depicts a flowchart of an example process for providing a summary of a meeting based on a digital recording of a meeting in accordance with an illustrative embodiment.

With reference to FIG. 13 this figure depicts a flowchart of an example process 1300 for providing a summary of a meeting based on a digital recording of the meeting in accordance with an illustrative embodiment. In a particular embodiment, the summary reporting module 414 carries out the process 1300.

In an embodiment, at block 1302, the process determines whether the current summary is a supervisory report or a general report. If general, the process continues to block 1304, where the process receives transcripts of all meeting participants, for example from a transcription module 516 of FIG. 5 or a transcription module 612 of FIG. 6. Next, at block 1306, the process combines transcripts using temporal metadata.

On the other hand, if the summary is supervisory level, then at block 1310 the process retrieves only transcripts of leaders during the meeting, for example from a transcription module 516 of FIG. 5 or a transcription module 612 of FIG. 6.

Next, at block 1308, the process eliminates stop words from the transcipt(s) (e.g., a, an, the, etc.). Next, at block 1312, the process tokenizes the remaining transcript data into sentences, and at block 1314, the process creates sentence embeddings using pretrained machine learning models. At block 1316, the process clusters the embeddings into a summary using the number of clusters as an indicator of a number of sentences to use for the summary.

Figure 14:
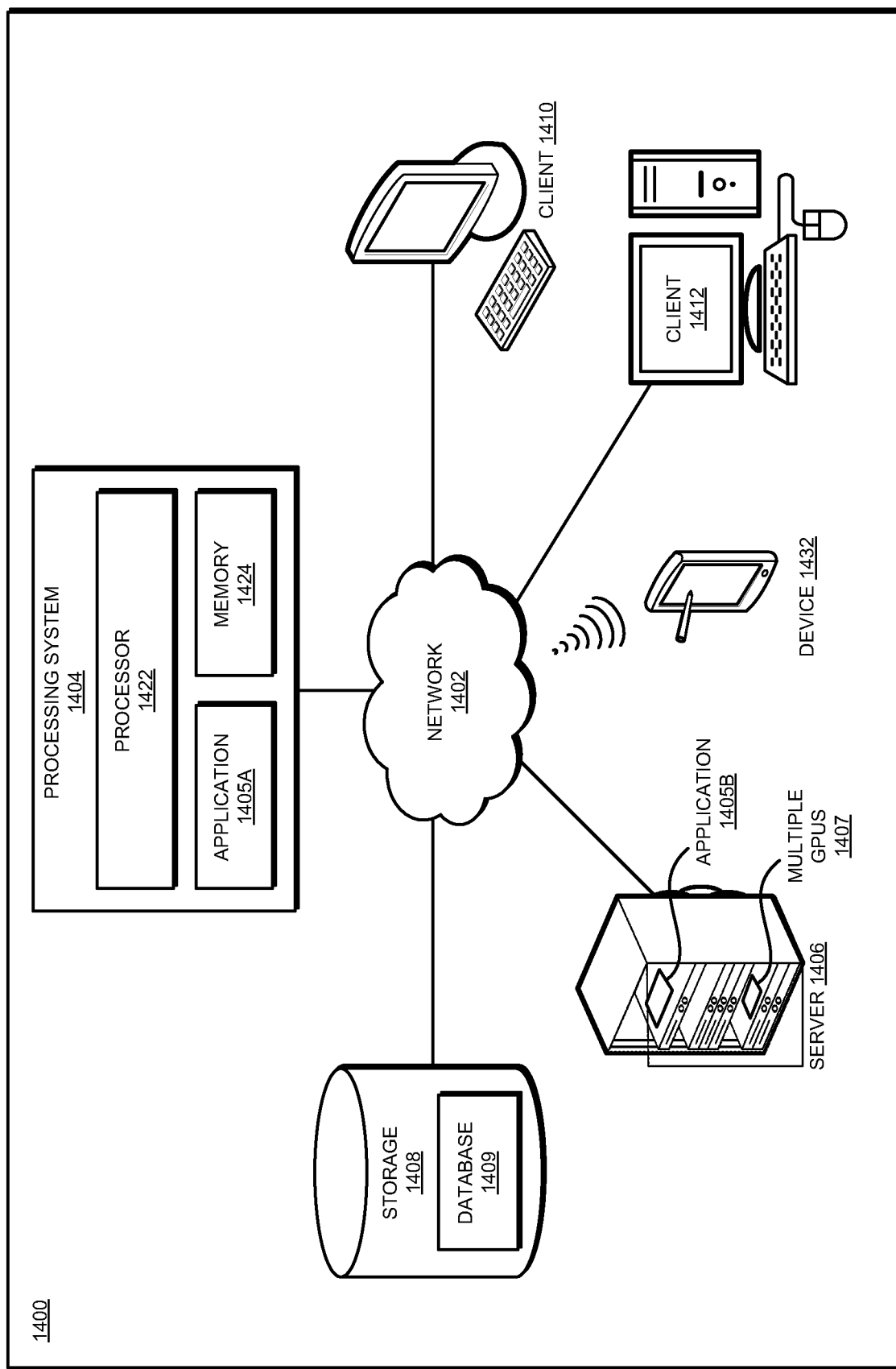
FIG. 14 depicts a block diagram of a network of data processing systems in which illustrative embodiments may be implemented.
Figure 15:
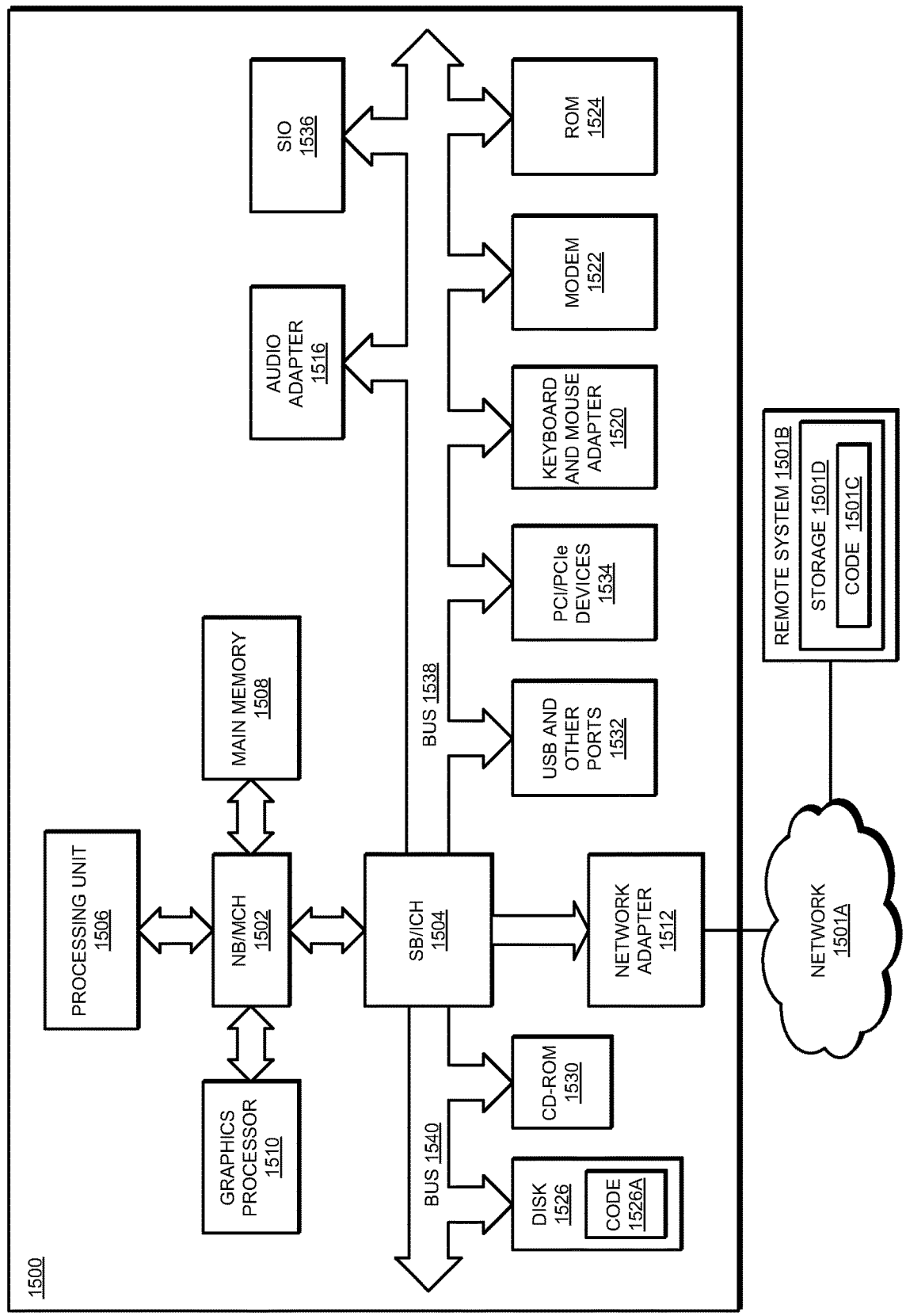
FIG. 15 depicts a block diagram of a data processing system in which illustrative embodiments may be implemented.

With reference to the figures and in particular with reference to FIGS. 14 and 15, these figures are example diagrams of data processing environments in which illustrative embodiments may be implemented. FIGS. 14 and 15 are only examples and are not intended to assert or imply any limitation with regard to the environments in which different embodiments may be implemented. A particular implementation may make many modifications to the depicted environments based on the following description.

FIG. 14 depicts a block diagram of a network of data processing systems in which illustrative embodiments may be implemented. Data processing environment 1400 is a network of computers in which the illustrative embodiments may be implemented. Data processing environment 1400 includes network 1402. Network 1402 is the medium used to provide communications links between various devices and computers connected together within data processing environment 1400. Network 1402 may include connections, such as wire, wireless communication links, or fiber optic cables.

Clients or servers are only example roles of certain data processing systems connected to network 1402 and are not intended to exclude other configurations or roles for these data processing systems. Data processing system 1404 couples to network 1402. Software applications may execute on any data processing system in data processing environment 1400. Any software application described as executing in processing system 1404 in FIG. 14 can be configured to execute in another data processing system in a similar manner. Any data or information stored or produced in data processing system 1404 in FIG. 14 can be configured to be stored or produced in another data processing system in a similar manner. A data processing system, such as data processing system 1404, may contain data and may have software applications or software tools executing computing processes thereon. In an embodiment, data processing system 1404 includes memory 1424, which includes application 1405A that may be configured to implement one or more of the data processor functions described herein in accordance with one or more embodiments.

Server 1406 couples to network 1402 along with storage unit 1408. Storage unit 1408 includes a database 1409 configured to store data as described herein with respect to various embodiments, for example image data and attribute data. Server 1406 is a conventional data processing system. In an embodiment, server 1406 includes an application 1405B that may be configured to implement one or more of the processor functions described herein in accordance with one or more embodiments.

Clients 1410, 1412, and 1414 are also coupled to network 1402. A conventional data processing system, such as server 1406, or client 1410, 1412, or 1414 may contain data and may have software applications or software tools executing conventional computing processes thereon.

Only as an example, and without implying any limitation to such architecture, FIG. 14 depicts certain components that are usable in an example implementation of an embodiment. For example, server 1406, and clients 1410, 1412, 1414, are depicted as servers and clients only as example and not to imply a limitation to a client-server architecture. As another example, an embodiment can be distributed across several data processing systems, and a data network as shown, whereas another embodiment can be implemented on a single data processing system within the scope of the illustrative embodiments. Conventional data processing systems 1406, 1410, 1412, and 1414 also represent example nodes in a cluster, partitions, and other configurations suitable for implementing an embodiment.

Device 1432 is an example of a conventional computing device described herein. For example, device 1432 can take the form of a smartphone, a tablet computer, a laptop computer, client 1410 in a stationary or a portable form, a wearable computing device, or any other suitable device. In an embodiment, device 1432 sends requests to server 1406 to perform one or more data processing tasks by application 1405B such as initiating processes described herein of the registry server. Any software application described as executing in another conventional data processing system in FIG. 14 can be configured to execute in device 1432 in a similar manner. Any data or information stored or produced in another conventional data processing system in FIG. 14 can be configured to be stored or produced in device 1432 in a similar manner.

Server 1406, storage unit 1408, data processing system 1404, and clients 1410, 1412, and 1414, and device 1432 may couple to network 1402 using wired connections, wireless communication protocols, or other suitable data connectivity. Clients 1410, 1412, and 1414 may be, for example, personal computers or network computers.

In the depicted example, server 1406 may provide data, such as boot files, operating system images, and applications to clients 1410, 1412, and 1414. Clients 1410, 1412, and 1414 may be clients to server 1406 in this example. Clients 1410, 1412, 1414, or some combination thereof, may include their own data, boot files, operating system images, and applications. Data processing environment 1400 may include additional servers, clients, and other devices that are not shown.

In the depicted example, memory 1424 may provide data, such as boot files, operating system images, and applications to processor 1422. Processor 1422 may include its own data, boot files, operating system images, and applications. Data processing environment 1400 may include additional memories, processors, and other devices that are not shown.

In the depicted example, data processing environment 1400 may be the Internet. Network 1402 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 1400 also may be implemented as a number of different types of networks, such as for example, an intranet, a local area network (LAN), or a wide area network (WAN). FIG. 14 is intended as an example, and not as an architectural limitation for the different illustrative embodiments.

Among other uses, data processing environment 1400 may be used for implementing a host-server container-enabled environment in which the illustrative embodiments may be implemented. A host-server container-enabled environment enables containerized software applications and data to be distributed across a network such that an application functions by using the interactivity between a conventional client data processing system and a conventional server data processing system. Data processing environment 1400 may also employ a service-oriented architecture where interoperable software components distributed across a network may be packaged together as coherent business applications. Data processing environment 1400 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 15, this figure depicts a block diagram of a data processing system in which illustrative embodiments may be implemented. Data processing system 1500 is an example of a conventional computer, such as data processing system 1404, server 1406, or clients 1410, 1412, and 1414 in FIG. 14, or another type of device in which computer usable program code or instructions implementing the processes may be located for the illustrative embodiments.

Data processing system 1500 is also representative of a conventional data processing system or a configuration therein, such as conventional data processing system 1432 in FIG. 14 in which computer usable program code or instructions implementing the processes of the illustrative embodiments may be located. Data processing system 1500 is described as a computer only as an example, without being limited thereto. Implementations in the form of other devices, such as device 1432 in FIG. 14, may modify data processing system 1500, such as by adding a touch interface, and even eliminate certain depicted components from data processing system 1500 without departing from the general description of the operations and functions of data processing system 1500 described herein.

In the depicted example, data processing system 1500 employs a hub architecture including North Bridge and memory controller hub (NB/MCH) 1502 and South Bridge and input/output (I/O) controller hub (SB/ICH) 1504. Processing unit 1506, main memory 1508, and graphics processor 1510 are coupled to North Bridge and memory controller hub (NB/MCH) 1502. Processing unit 1506 may contain one or more processors and may be implemented using one or more heterogeneous processor systems. Processing unit 1506 may be a multi-core processor. Graphics processor 1510 may be coupled to NB/MCH 1502 through an accelerated graphics port (AGP) in certain implementations.

In the depicted example, local area network (LAN) adapter 1512 is coupled to South Bridge and I/O controller hub (SB/ICH) 1504. Audio adapter 1516, keyboard and mouse adapter 1520, modem 1522, read only memory (ROM) 1524, universal serial bus (USB) and other ports 1532, and PCI/PCIe devices 1534 are coupled to South Bridge and I/O controller hub 1504 through bus 1538. Hard disk drive (HDD) or solid-state drive (SSD) 1526 and CD-ROM 1530 are coupled to South Bridge and I/O controller hub 1504 through bus 1540. PCI/PCIe devices 1534 may include, for example, Ethernet adapters, add-in cards, and PC cards for notebook computers. PCI uses a card bus controller, while PCIe does not. ROM 1524 may be, for example, a flash binary input/output system (BIOS). Hard disk drive 1526 and CD-ROM 1530 may use, for example, an integrated drive electronics (IDE), serial advanced technology attachment (SATA) interface, or variants such as external-SATA (eSATA) and micro-SATA (mSATA). A super I/O (SIO) device 1536 may be coupled to South Bridge and I/O controller hub (SB/ICH) 1504 through bus 1538.

Memories, such as main memory 1508, ROM 1524, or flash memory (not shown), are some examples of computer usable storage devices. Hard disk drive or solid-state drive 1526, CD-ROM 1530, and other similarly usable devices are some examples of computer usable storage devices including a computer usable storage medium.

An operating system runs on processing unit 1506. The operating system coordinates and provides control of various components within data processing system 1500 in FIG. 15. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 1500.

Instructions for the operating system, the object-oriented programming system, and applications or programs, such as application 1405 in FIG. 14, are located on storage devices, such as in the form of code 1526A on hard disk drive 1526, and may be loaded into at least one of one or more memories, such as main memory 1508, for execution by processing unit 1506. The processes of the illustrative embodiments may be performed by processing unit 1506 using computer implemented instructions, which may be located in a memory, such as, for example, main memory 1508, read only memory 1524, or in one or more peripheral devices.

Furthermore, in one case, code 1526A may be downloaded over network 1501A from remote system 1501B, where similar code 1501C is stored on a storage device 1501D. in another case, code 1526A may be downloaded over network 1501A to remote system 1501B, where downloaded code 1501C is stored on a storage device 1501D.

The hardware in FIGS. 14-15 may vary depending on the implementation. Other internal hardware or peripheral devices, such as flash memory, equivalent non-volatile memory, or optical disk drives and the like, may be used in addition to or in place of the hardware depicted in FIGS. 14-15. In addition, the processes of the illustrative embodiments may be applied to a multiprocessor data processing system.

In some illustrative examples, data processing system 1500 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 1508 or a cache, such as the cache found in North Bridge and memory controller hub 1502. A processing unit may include one or more processors or CPUs.

The depicted examples in FIGS. 14-15 and above-described examples are not meant to imply architectural limitations. For example, data processing system 1500 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 1500 using virtualized manifestation of some or all components depicted in data processing system 1500. For example, in a virtual machine, virtual device, or virtual component, processing unit 1506 is manifested as a virtualized instance of all or some number of hardware processing units 1506 available in a host data processing system, main memory 1508 is manifested as a virtualized instance of all or some portion of main memory 1508 that may be available in the host data processing system, and disk 1526 is manifested as a virtualized instance of all or some portion of disk 1526 that may be available in the host data processing system. The host data processing system in such cases is represented by data processing system 1500.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "illustrative" is used herein to mean "serving as an example, instance or illustration." Any embodiment or design described herein as "illustrative" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and a direct "connection."

References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

Thus, a computer implemented method, system or apparatus, and computer program product are provided in the illustrative embodiments for managing participation in online communities and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the present invention may also be delivered as part of a service engagement with a client corporation, nonprofit organization, government entity, internal organizational structure, or the like. Aspects of these embodiments may include configuring a computer system to perform, and deploying software, hardware, and web services that implement, some or all of the methods described herein. Aspects of these embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems. Although the above embodiments of present invention each have been described by stating their individual advantages, respectively, present invention is not limited to a particular combination thereof. To the contrary, such embodiments may also be combined in any way and number according to the intended deployment of present invention without losing their beneficial effects.

What is claimed is:

1. A computer-implemented method comprising:

extracting, by an entity-relation extraction module, a set of designated entities and a set of relationships between designated entities from speech content of an audio feed of a plurality of participants of a current web conference, wherein the extracting uses a first machine learning model that is trained to classify parts of speech content;

generating, by a current listing module, a list of current action items based on the extracted set of designated entities and the set of relationships between designated entities;

identifying, by a list comparison module, a first current action item from the list of current action items that is an updated version of an ongoing action item on a progress list, wherein the progress list includes a set of ongoing action items from past web conferences prior to the current web conference;

identifying, by the list comparison module, a second current action item from the list of current action items that is unrelated to any of the set of ongoing action items on the progress list;

updating, by a progress list updating module, the progress list to an updated progress list by updating the first ongoing action item based on the first current action item and by adding the second current action item as a new ongoing action item on the progress list;

generating, by a summary reporting module, a progress report based on the updated progress list; and partitioning, by a clustering module, the audio feed into clusters of audio feed data of the audio feed using a second machine learning model that forms a plurality of clusters based on prosodic features of the audio feed.

2. The method of claim 1, further comprising:

analyzing, by a transcription module, the audio feed using speech recognition to retrieve the speech content of the audio feed.

3. The method of claim 1, wherein the set of designated entities comprises participants, tasks, and dates.

4. The method of claim 3, wherein the set of relationships between designated entities comprises associations between tasks and participants and associations between tasks and dates.

5. The method of claim 1, further comprising:

training, by a model training module, the machine learning model using a meeting minutes corpus for the designated entities and the relationships between designated entities.

6. The method of claim 1, wherein the partitioning further comprises:

detecting, by a cluster verification module, that the plurality of clusters is not equal in number to the plurality of participants; and performing, by a model adjustment module, iterations of model adjustment process until the plurality of clusters is equal in number to the plurality of participants.

7. The method of claim 6, wherein the model adjustment process comprises:
generating, by the model adjustment module, an adjusted set of parameters for the second machine learning model; and
using, by the clustering module, the second machine learning model with the adjusted set of parameters to update the plurality of clusters.

8. The method of claim 7, further comprising:
associating, by a cluster labeling module, a label with a selected cluster of the plurality of clusters, wherein the label includes a reference to an identified participant associated with the selected cluster.

9. The method of claim 8, wherein the extracting of the set of designated entities includes extracting a designated entity from the selected cluster and extracting a relationship between the identified participant and the designated entity.

10. A computer program product comprising one or more computer readable storage media, and program instructions collectively stored on the one or more computer readable storage media, the program instructions executable by a processor to cause the processor to perform operations comprising:
extracting, by an entity-relation extraction module, a set of designated entities and a set of relationships between designated entities from speech content of an audio feed of a plurality of participants of a current web conference, wherein the extracting uses a first machine learning model that is trained to classify parts of speech content;
generating, by a current listing module, a list of current action items based on the extracted set of designated entities and the set of relationships between designated entities;
identifying, by a list comparison module, a first current action item from the list of current action items that is an updated version of an ongoing action item on a progress list, wherein the progress list includes a set of ongoing action items from past web conferences prior to the current web conference;
identifying, by the list comparison module, a second current action item from the list of current action items that is unrelated to any of the set of ongoing action items on the progress list;
updating, by a progress list updating module, the progress list to an updated progress list by updating the first ongoing action item based on the first current action item and by adding the second current action item as a new ongoing action item on the progress list;
generating, by a summary reporting module, a progress report based on the updated progress list; and
partitioning, by a clustering module, the audio feed into clusters of audio feed data of the audio feed using a second machine learning model that forms a plurality of clusters based on prosodic features of the audio feed.

11. The computer program product of claim 10, wherein the stored program instructions are stored in a computer readable storage device in a data processing system, and wherein the stored program instructions are transferred over a network from a remote data processing system.

12. The computer program product of claim 10, wherein the stored program instructions are stored in a computer readable storage device in a server data processing system, and wherein the stored program instructions are downloaded in response to a request over a network to a remote data processing system for use in a computer readable storage device associated with the remote data processing system, further comprising:
program instructions to meter use of the program instructions associated with the request; and
program instructions to generate an invoice based on the metered use.

13. The computer program product of claim 10, wherein the set of designated entities comprises participants, tasks, and dates.

14. The computer program product of claim 13, wherein the set of relationships between designated entities comprises associations between tasks and participants and associations between tasks and dates.

15. The computer program product of claim 10, further comprising:
training, by a model training module, the machine learning model using a meeting minutes corpus for the designated entities and the relationships between designated entities.

16. A computer system comprising a processor and one or more computer readable storage media, and program instructions collectively stored on the one or more computer readable storage media, the program instructions executable by the processor to cause the processor to perform operations comprising:
extracting, by an entity-relation extraction module, a set of designated entities and a set of relationships between designated entities from speech content of an audio feed of a plurality of participants of a current web conference, wherein the extracting uses a first machine learning model that is trained to classify parts of speech content based on prosodic features of the audio feed;
generating, by a current listing module, a list of current action items based on the extracted set of designated entities and the set of relationships between designated entities;
identifying, by a list comparison module, a first current action item from the list of current action items that is an updated version of an ongoing action item on a progress list, wherein the progress list includes a set of ongoing action items from past web conferences prior to the current web conference;
identifying, by the list comparison module, a second current action item from the list of current action items that is unrelated to any of the set of ongoing action items on the progress list;
updating, by a progress list updating module, the progress list to an updated progress list by updating the first ongoing action item based on the first current action item and by adding the second current action item as a new ongoing action item on the progress list;
generating, by a summary reporting module, a progress report based on the updated progress list; and
partitioning, by a clustering module, the audio feed into clusters of audio feed data of the audio feed using a second machine learning model that forms a plurality of clusters based on prosodic features of the audio feed.

17. The computer system of claim 16, wherein the set of designated entities comprises participants, tasks, and dates.

18. The computer system of claim 17, wherein the set of relationships between designated entities comprises associations between tasks and participants and associations between tasks and dates.

19. The computer system of claim 16, further comprising:
training, by a model training module, the machine learning model using a meeting minutes corpus for the designated entities and the relationships between designated entities.

\* \* \* \* \*